(12) United States Patent
Koura et al.

(10) Patent No.: US 6,391,965 B1
(45) Date of Patent: *May 21, 2002

(54) PRODUCTION PROCESS OF ABS RESIN, ABS RESIN, AND ABS-POLYCARBONATE RESIN COMPOSITION MAKING USE OF THE SAME

(75) Inventors: Takashi Koura; Mune Iwamoto; Ryuichi Sugimoto, all of Osaka; Takayasu Ikeda, Kanagawa; Koji Kawano; Shiro Otsuzuki, both of Osaka, all of (JP)

(73) Assignee: Mitsui Chemicals, Inc. (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/861,657

(22) Filed: May 22, 1997

(30) Foreign Application Priority Data

| | | |
|---|---|---|
| May 31, 1996 | (JP) | 8-138453 |
| Aug. 14, 1996 | (JP) | 8-214585 |
| Aug. 14, 1996 | (JP) | 8-214586 |
| Sep. 6, 1996 | (JP) | 8-236593 |
| Sep. 6, 1996 | (JP) | 8-236594 |
| Sep. 9, 1996 | (JP) | 8-237929 |

(51) Int. Cl.$^7$ .................... C08F 279/04; C08F 2/01
(52) U.S. Cl. .................... 525/52; 525/53; 525/67; 525/193; 525/316
(58) Field of Search .................... 525/52, 53, 67, 525/193, 316

(56) References Cited

U.S. PATENT DOCUMENTS

| | | | |
|---|---|---|---|
| 3,981,944 A | | 9/1976 | Okamoto et al. |
| 4,526,926 A | * | 7/1985 | Weber .................... 525/67 |
| 4,677,162 A | * | 6/1987 | Grigo .................... 525/67 |
| 5,177,145 A | | 1/1993 | Dujardin et al. |
| 5,250,606 A | | 10/1993 | Guest et al. |
| 5,264,492 A | | 11/1993 | Demirörs |
| 5,387,650 A | * | 2/1995 | Baumgartner .................... 525/53 |
| 5,506,304 A | * | 4/1996 | Otsuzuki .................... 525/53 |

FOREIGN PATENT DOCUMENTS

| | | | |
|---|---|---|---|
| EP | 412801 | 2/1991 | |
| EP | 444704 | 9/1991 | |
| EP | 0477764 | 4/1992 | |
| JP | 050235 | * 12/1972 | .................... 525/53 |
| JP | 050236 | * 12/1972 | |
| JP | 49-7343 | 2/1974 | |
| JP | 117791 | * 10/1976 | |
| JP | 61-148258 | 7/1986 | |
| JP | 62-39176 | 8/1987 | |
| JP | 62-240352 | 10/1987 | |
| JP | 63-118315 | 5/1988 | |
| JP | 3-7708 | 1/1991 | |
| JP | 6-192346 | 7/1994 | |
| JP | 06-192346 | 7/1994 | |
| JP | 7-233204 | 9/1995 | |

OTHER PUBLICATIONS

Russell "Introduction to Chemical Engineering Analysis" pp. 198–199.*

* cited by examiner

Primary Examiner—David J. Buttner
(74) Attorney, Agent, or Firm—Burns, Doane, Swecker & Mathis, L.L.P.

(57) ABSTRACT

A process is disclosed for the continuous production of an ABS resin. The polymerization step comprises at least two substeps, one being a first-stage substep of forming particles of the rubbery polymer and the other a second-stage substep of adjusting the particle sizes of the particles. The first-stage substep is conducted in a polymerization system making use of a plug flow reactor or a batch polymerization reactor, and conducts polymerization at least until the particles are formed in the polymerization mixture. The second-stage substep increases a converted amount of the monomer component into the polymer compared with that in the particle forming substep and makes the particles smaller. A polycarbonate-ABS resin composition is also disclosed.

17 Claims, 1 Drawing Sheet

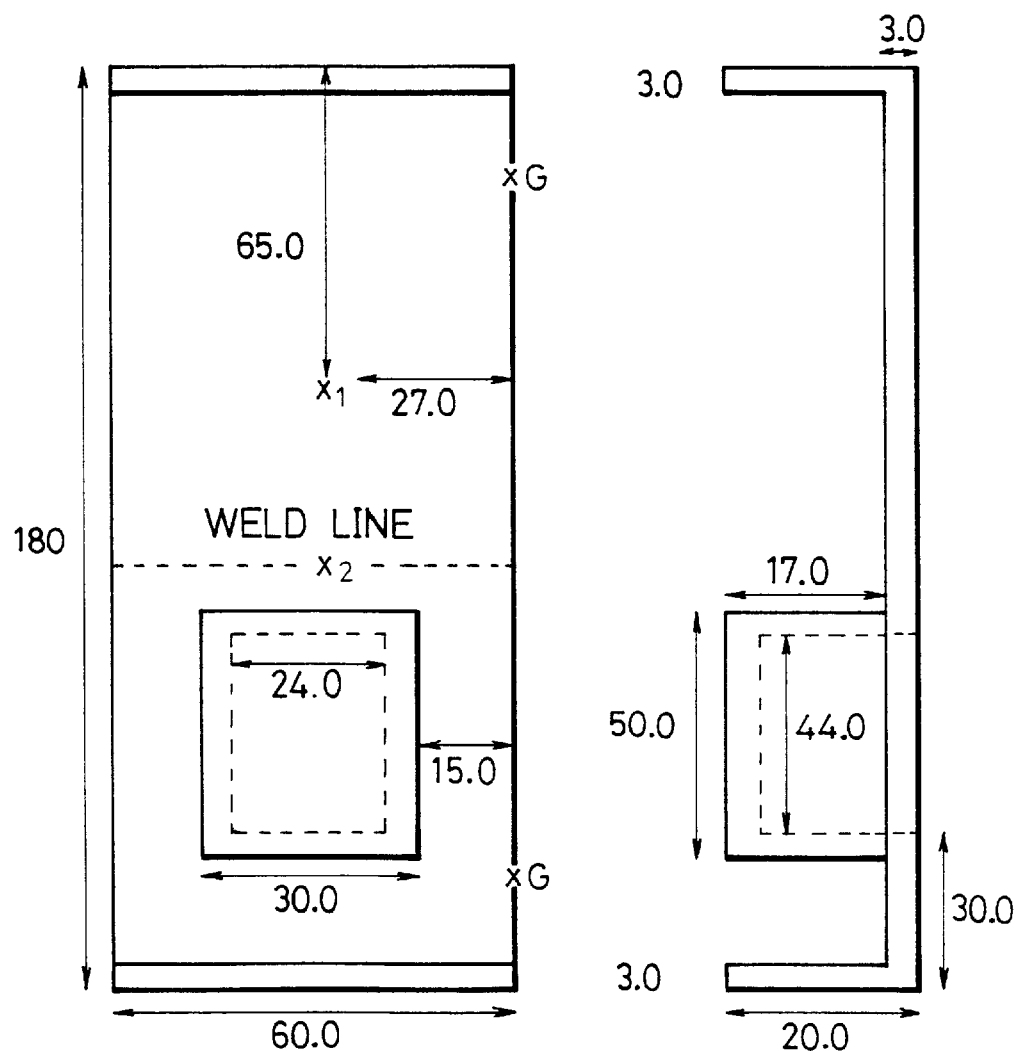

PRODUCTION PROCESS OF ABS RESIN, ABS RESIN, AND ABS-POLYCARBONATE RESIN COMPOSITION MAKING USE OF THE SAME

BACKGROUND OF THE INVENTION a) Field of the Invention

This invention relates to a production process of an ABS resin and also to an ABS-polycarbonate resin composition making use of the ABS resin. In more detail, the present invention is concerned with a production process of an ABS resin having excellent impact resistance and capable of providing a molding good in weld strength and substantially improved in location-dependent gloss differences, with the ABS resin obtained by the production process, and also with an ABS-polycarbonate resin composition making use of the ABS resin and having good moldability, high resistance to thermal deteriorations, and improved in heat resistance and impact strength, especially impact resistance at low temperatures and the strength of ribbed portions.

b) Description of the Related Art

ABS resins have heretofore been produced by emulsion polymerization or continuous bulk or solution polymerization in general. Emulsion polymerization may not be preferred depending on the application, because the resultant ABS resin contains an impurity such as an emulsifier. In addition, a significant cost is needed to treat water, which is used in the polymerization, prior to its disposal. As a consequence, continuous bulk polymerization free of these problems has found increasing utility as a new production process. This invention is to significantly improve the quality by using such continuous bulk polymerization or continuous solution polymerization.

The present inventors have proceeded with an investigation to solve troublesome unevenness in the gloss of a molding, which is considered to be attributable to the development of a lower gloss at a location where no sufficient molding pressure is exerted during molding work (low-pressure portion). As a result, it has been surprisingly found that this problem can be completely solved by applying certain special conditions to continuous bulk polymerization and/or continuous solution polymerization.

The present inventors are not aware of any art which prior to the present invention, dealt with improvements of one or more steps in continuous bulk polymerization and/or continuous solution polymerization in an attempt to solve such a problem and is acknowledged to have brought about marked effects.

For example, Japanese Patent Publication No. SHO 49-7343/1974 discloses a process in which with a view to retaining impact resistance by an increased gel content upon reduction of the particle size of a rubbery polymer, provisional polymerization is conducted in a first polymerization reactor with the rubbery polymer being maintained in a state not converted into a dispersed phase and polymerization is then conducted in a second polymerization reactor to convert the rubbery polymer into a dispersed phase. This process however involves a problem in the theme of the invention of the present application that improvements be made in the uneven gloss of a molding of an ABS resin obtained by continuous bulk polymerization.

Japanese Patents Laid-Open Nos. SHO 63-118315/1988 and SHO 3-7708/1991, EP 477764(A), etc. also disclose processes improved over the so-called provisional polymerization process, in each of which in a multi-reactor polymerization process making use of two or more reactors, conversion of a rubbery polymer into a dispersed phase is conducted in the second reactor. These process are however still insufficient for improving the uneven gloss of a molding of an ABS resin obtained by continuous bulk polymerization.

Further, Japanese Patent Laid-Open No. HEI 7-233204/1995 discloses a process in which a plug flow reactor is used as a first polymerization reactor to conduct provisional polymerization with a rubbery polymer being maintained in a state not converted into a dispersed phase and polymerization is then conducted in a second polymerization reactor to convert the rubbery polymer into a dispersed phase. This process is however not intended to improve such uneven gloss of a molding of an ABS resin, which is obtained by continuous bulk polymerization and/or continuous solution polymerization, as dealt with in the invention of the present application, although it is superior in impact resistance and gloss to processes which primarily use a back-mixed stirred tank reactor and are often employed in continuous bulk polymerization and/or continuous solution polymerization.

Japanese Patent Laid-Open No. HEI 6-192346/1994 discloses a process, in which rubber particles are formed using a special rubber component of the branched form in a plug flow reactor as a first polymerization reactor and their particle sizes are then adjusted using a particular shear machine. This process is however not preferred, because it additionally requires the shear machine so that the process steps and facilities become more complex. In addition, this process cannot achieve improvements in such uneven gloss as dealt with in the invention of the present application, since it is an object of this art to make improvements in impact resistance and gloss and no sufficient homogeneity can be achieved in the particle size of a rubbery polymer by a mechanical particle size adjustment making use of such a shearing machine.

The invention of the present application is to provide a process which does not specifically require any particular shearing machine.

Incidentally, ABS-polycarbonate resin compositions are known as resin compositions having excellent heat resistance and impact resistance, and are used as molding, materials.

Keeping in step with the wide-spread use of these compositions as large and thin-wall molding materials and high-speed injection molding materials in recent years, these conventional compositions have developed increasing problems because they exhibit low fluidity during molding and hence have low moldability and require long time for molding. In addition, as the range of applications of moldings becomes greater owing to the move toward moldings with thinner walls, there is an increasing need for the impartation of impact resistance, especially low-temperature impact resistance.

Improvements have also been proposed with a view to achieving these themes.

For example, Japanese Patent Laid-Open No. SHO 62-240352/1987 discloses, at page 1, lower left column, line 12 to page 2, upper right column, line 20, a process in which with a view to reducing a deterioration in the impact strength of a cracked molded piece, a graft copolymer is blended with an aromatic polycarbonate. This graft copolymer is obtained by graft-copolymerizing a rubbery polymer with two or more monomers selected from aromatic vinyl monomers, cyanated vinyl monomers or alkyl methacrylates. The content of the rubbery polymer is 60 wt. % or higher, the grafting degree the rubbery polymer is 50% or lower, and the intrinsic viscosity of a non-grafted resin component is 0.6 dl/g or lower.

The above process however still requires an improvement in mechanical strength, especially rigidity or heat resistance because of a high content of a rubbery polymer in an ABS resin. For the adoption of emulsion polymerization, an additive such as an emulsifier is needed and in addition, treatment of waste water is also needed, resulting in complex steps. The process is therefore still accompanied by problems to be solved from the standpoint of economy. Further, the process failed to bring about any substantial improvement in low-temperature impact resistance.

Further, Japanese Patent Publication No. SHO 62-39176/1987 discloses, at page 2, left column, line 39 to right column, line 42, a process in which the low-temperature impact strength of a polycarbonate is improved by blending two types of ABS resins having different rubber particle sizes and grafting degrees which fall within specific ranges, respectively.

However, this process is also disadvantageous from the industrial standpoint because it becomes complex due to the need for the separate production of the two types of ABS resins of different compositions and their subsequent blending with the polycarbonate. In addition, the process is still not considered to be sufficient with respect to the improvement of low-temperature impact strength.

Japanese Patent Laid-Open No. SHO 61-148258/1966 discloses, at page 1, lower right column, line 10 to page 2, lower right column 15, a process in which two types of ABS resins different in rubber content, one having a high rubber content and the other a low rubber content, and, if necessary, an AS resin are blended to improve the balance among heat resistance, impact resistance and moldability.

However, to produce an ABS resin of a high rubber content and high grafting degree, limitations are unavoidably imposed on its production process. In particular, application of bulk polymerization is difficult. Moreover, like the above-mentioned processes, this process also become complex because of the need for the separate production of the two types of ABS resins and optionally, the one type of AS resin and their blending with a polycarbonate.

SUMMARY OF THE INVENTION

As has been described above, it is the object of the present invention to provide a production process of an ABS resin having novel functions so that a molding can be obtained with reduced unevenness in gloss and with well-balanced excellent properties. It is also the object of the present invention to provide an ABS-polycarbonate resin composition of superb physical properties by blending the ABS resin in a polycarbonate.

With a view to achieving the above-described objects, the present inventors have proceeded with an extensive investigation, leading to the present invention. Namely, the present invention provides a process for the continuous production of an ABS resin, including a step of polymerizing 100 parts by weight of a monomer component, which is composed of a styrene monomer and an acrylonitrile monomer or of a mixture thereof and a vinyl monomer copolymerizable with at least one of the monomers, in the presence of 4 to 50 parts by weight of a rubbery polymer by continuous bulk and/or continuous solution polymerization to form a polymer of the monomer component as a continuous phase and particles of the rubber polymer as a dispersed phase, wherein:

(1) the polymerization step comprises at least two substeps, one being a first-stage substep of forming particles of the rubbery polymer and the other being a second-stage substep of adjusting the particle sizes of the particles;

(2) the first-stage polymerization substep as the particle forming substep is conducted in a polymerization system making use of a plug flow reactor or a batch polymerization reactor, and conducts polymerization at least until the particles of the rubbery polymer are formed in the polymerization mixture; and (3) the second-stage polymerization substep as the particle size adjusting substep increases a converted amount of the monomer component into the polymer compared with that in the particle forming substep and makes smaller the particles of the rubbery polymer formed in the particle forming substep.

This invention also provides an ABS-polycarbonate resin composition comprising:

(I) 100 parts by weight of a thermoplastic polycarbonate, and (II) 10 to 500 parts by weight of an ABS resin; wherein
1) the ABS resin (II) is available by the above-described process,
2) the ABS resin (II) comprises 5 to 30 wt. % of the rubbery polymer,
3) a polymer component (A) in the ABS resin (II), said polymer component (A) being available by elimination of insoluble components from the ABS resin (II) through extraction of the ABS resin (II) at 25° C. with a 7:3 (by weight) mixed solvent of methyl ethyl ketone and methanol, comprises 8 to 30 wt. % of an acrylonitrile component,
4) the polymer component (A) has a reduced viscosity ($\eta_{sp}/c$) of from 0.2 to 0.65 dl/g, and
5) the rubbery polymer comprises at least butadiene parts, and a grafting degree of a styrene/acrylonitrile copolymer on the butadiene parts of the rubbery polymer in the ABS resin (II) ranges from 55 to 200%.

BRIEF DESCRIPTION OF THE DRAWINGS

For a more complete understanding of this invention, reference may be had to the following detailed description with reference to the accompanying drawings in which:

FIG. 1A is a plan view of a specimen employed for the evaluation of surface gloss and falling weight impact strength; and FIG. 1B is a cross-sectional view of the specimen.

DESCRIPTION OF THE PREFERRED EMBODIMENTS

The present invention embraces the following embodiments:

(a) A process for the continuous production of an ABS resin, including a step of polymerizing 100 parts by weight of a monomer component, which is composed of a styrene monomer and an acrylonitrile monomer or of a mixture thereof and a vinyl monomer copolymerizable with at least one of the monomers, in the presence of 4 to 50 parts by weight of a rubbery polymer by continuous bulk and/or continuous solution polymerization to form a polymer of the monomer component as a continuous phase and particles of the rubber polymer as a dispersed phase, wherein:

(1) the polymerization step comprises at least two substeps, one being a first-stage substep of forming particles of the rubbery polymer and the other being a second-stage substep of adjusting the particle sizes of the particles;

(2) the first-stage polymerization substep as the particle forming substep is conducted in a polymerization system making use of a plug flow reactor or a batch polymerization reactor, and conducts polymerization at least until the particles of the rubbery polymer are formed in the polymerization mixture; and (3) the second-stage polymerization substep as the particle size adjusting substep increases a converted amount of the monomer component into the polymer compared with that in the particle forming substep and makes smaller the particles of the rubbery polymer formed in the particle forming substep.

(b) The process described above under (a), wherein the polymerization step further comprises, as a third-stage substep, a post-polymerization substep that subsequent to completion of the particle size adjusting substep, the polymerization is conducted further to increase a conversion rate while maintaining the particles of the rubbery polymer in the same sizes as those of the particles of the rubbery polymer at the time of the completion of the particle size adjusting substep.

(c) The process described above under (a), further comprising a step so that from a polymerization mixture obtained from the polymerization step comprising the particle forming substep and the particle size adjusting substep, (i) the ABS resin and (ii) an unreacted portion of the monomer component and an inert inorganic solvent employed in the polymerization are recovered in forms separated from each other.

(d) The process described above under (a), wherein the plug flow reactor is a tower reactor.

(e) The process described above under (a), wherein a back-mixed stirred tank reactor is used as a polymerization reactor in the particle size adjusting substep.

(f) The process described above under (a), wherein the polymerization step is conducted to satisfy the following formula:

$$\eta_1/\eta_2 \leq 0.98$$

wherein $\eta_1$ represents a reduced viscosity of a copolymer extracted from a polymerization mixture at 25° C., which is available at the time of completion of the particle forming substep, in a 7:3 (by weight) mixed solvent of methyl ethyl ketone (MEK) and methanol (MeOH) as measured at 30° C. using dimethylformamide (DMF) as a solvent, and $\eta_2$ represents a reduced viscosity of a similar extract from a polymerization mixture available at the time of completion of the particle size adjusting substep as measured in a similar manner.

(g) The process described above under (a), wherein the polymerization step is conducted so that the following formulas [1], [2], [3] and [4] are satisfied:

$$B/A = x \qquad [1]$$

$$16 \leq A \text{ and } 0.1 \leq x, \text{ and } 17.6 \leq A + B \leq 50 \qquad [2]$$

-continued $$0 < \log(D_{P1}/D_{P2}) \leq 2 \qquad [3]$$

$$I_{P1}/I_{P2} \leq 15.0 \qquad [4]$$

wherein

A represents a converted amount of the whole monomer component into the polymer at the time of completion of the particle forming substep (2) as expressed in term of parts by weight supposing that a weight of an unreacted monomer component, a weight of the converted amount of the monomer component into the polymer and a weight of the rubbery polymer be 100 parts by weight, B is expressed by the following formula:

$$B = C - A$$

wherein C represents a converted amount of the whole monomer into the polymer at the time of completion of the particle size adjusting substep (3) as expressed in terms of parts by weight supposing that the total of a weight of an unreacted portion of the monomer component at the time of the completion of the particle size adjusting substep (3), the weight of the converted amount of the monomer component into the polymer and the weight of the rubbery polymer be 100 parts by weight, $D_{P1}$ represents an average particle size of the particles of the rubbery polymer at the time of the completion of the particle forming substep as expressed in terms of $\mu$m, $D_{P2}$ represents an average particle size of the particles of the rubbery polymer at the time of the completion of the particle size adjusting substep as expressed in terms of $\mu$m, $I_{P1}$ represents a particle size distribution index of the particles of the rubbery polymer at the time of the completion of the particle forming sub-step, and $I_{P2}$ represents a particle size distribution index of the particles of the rubbery polymer at the time of the completion of the particle size adjusting sub-step.

(h) The process described above under (g), wherein the polymerization step is conducted so that the following formulas [5] and [6] are satisfied:

$$18 \leq A \text{ and } 0.1 \leq x \leq 1.5, \text{ and } 19.8 \leq A + B \leq 45 \qquad [5]$$

$$D_{P1} < 2.0, \text{ and } 0 < \log(D_{P1}/D_{P2}) \leq 1.0 \qquad [6]$$

(i) The process described above under (g), wherein the particle forming substep is conducted for a residence time of from 0.5 to 3 hours, and the particle size adjusting substep is conducted for a residence time which ranges from 0.2 to 2.5 hours and is 0.2 to 0.9 times as long as the residence time of the particle forming substep.

(j) The process described above under (a), wherein the rubbery polymer comprises at least butadiene units, and a grafting degree of a styrene/acrylonitrile copolymer on the butadiene parts of the rubbery polymer in the ABS resin ranges from 55 to 200%.

(k) The process described above under (a), wherein the rubbery polymer comprises at least two types of styrene-butadiene copolymers (SBR) $R_1, R_2$, and the polymerization step is conducted so that the following formulas [7], [8], [9] and [10] are satisfied:

$$5 \leq SV_1 \leq 50, 12 \leq ST_1 \leq 30 \quad [7]$$

$$5 \leq SV_2 \leq 50, 25 \leq ST_2 \leq 50 \quad [8]$$

$$3 \leq ST_2 - ST_1 \leq 35 \quad [9]$$

$$1 \leq R_1/R_2 \leq 9 \quad [10]$$

wherein
  $SV_1$ represents a viscosity of a 5 wt. % styrene solution of the styrene-butadiene copolymer $R_1$ at 25° C. as expressed in terms of centipoises,
  $ST_1$ represents a content of styrene in the styrene-butadiene copolymer $R_1$ as expressed in terms of
  $SV_2$ represents a viscosity of a 5 wt. % styrene solution of the styrene-butadiene copolymer $R_2$ at 25° C. as expressed in terms of centipoises, and
  $ST_2$ represents a content of styrene in the styrene-butadiene copolymer $R_2$ as expressed in terms of wt. %.

(l) An ABS resin available by a continuous production process including a step of polymerizing 100 parts by weight of a monomer component, which is composed of a styrene monomer and an acrylonitrile monomer or of a mixture thereof and a vinyl monomer copolymerizable with at least one of the monomers, in the presence of 4 to 50 parts by weight of a rubbery polymer by continuous bulk and/or continuous solution polymerization to form a polymer of the monomer component as a continuous phase and particles of the rubber polymer as a dispersed phase, wherein:
  (1) the polymerization step comprises at least two substeps, one being a first-stage substep of forming particles of the rubbery polymer and the other being a second-stage substep of adjusting the particle sizes of the particles;
  (2) the first-stage polymerization substep as the particle forming substep is conducted in a polymerization system making use of a plug flow reactor or a batch polymerization reactor, and conducts polymerization at least until the particles of the rubbery polymer are formed in the polymerization mixture;
  (3) the second-stage polymerization substep as the particle size adjusting substep increases a converted amount of the monomer component into the polymer compared with that in the particle forming substep and makes smaller the particles of the rubbery polymer formed in the particle forming substep; and
  the rubbery polymer comprises at least butadiene parts, and a grafting degree of a styrene/acrylonitrile copolymer on the butadiene parts of the rubbery polymer in the ABS resin ranges from 55 to 200%.

(m) An ABS resin available by the continuous production process described above under (i), wherein the polymerization step is conducted so that the following formula is satisfied:

$$I_{P1}/I_{P2}<15.0$$

wherein
  $I_{P1}$ represents a particle size distribution index of the particles of the rubbery polymer at the time of the completion of the particle forming sub-step, and
  $I_{P2}$ represents a particle size distribution index of the particles of the rubbery polymer at the time of the completion of the particle size adjusting sub-step.

(n) An ABS-polycarbonate resin composition comprising:
  (I) 100 parts by weight of a thermoplastic polycarbonate, and
  (II) 10 to 500 parts by weight of an ABS resin; wherein
    1) the ABS resin (II) is available by the process described above under (a)–(k),
    2) the ABS resin (II) comprises 5 to 30 wt. % of the rubbery polymer,
    3) a polymer component (A) in the ABS resin (II), the polymer component (A) being available by elimination of insoluble components from the ABS resin (II) through extraction of the ABS resin. (II) at 25° C. with a 7:3 (by weight) mixed solvent of methyl ethyl ketone and methanol, comprises 8 to 30 wt. % of an acrylonitrile component,
    4) the polymer component (A) has a reduced viscosity $(\eta_{sp}/c)$ of from 0.2 to 0.65 dl/g, and
    5) the rubbery polymer comprises at least butadiene parts, and a grafting degree of a styrene/acrylonitrile copolymer on the butadiene parts of the rubbery polymer in the ABS resin (II) ranges from 55 to 200%.

(o) The composition described above under (n), wherein the polymer component (A) comprises 10 to 18 wt. % of the acrylonitrile component and has a reduced viscosity of from 0.3 to 0.45 dl/g, and the grafting degree of the styrene/acrylonitrile copolymer on the butadiene parts of the rubbery polymer in the ABS resin (II) ranges from 75 to 200%.

(p) The composition described above under (n), wherein the polymer component (A), the polymer component (A) being available by elimination of insoluble components from the ABS resin (II) through extraction of the ABS resin (II) at 25° C. with a 7:3 (by weight) mixed solvent of methyl ethyl ketone and methanol, has a number average molecular weight $[(Mn)_{ABS}]$ of from 10,000 to 40,000; and a relationship between the number average molecular weight $[(Mn)_{ABS}]$ of the polymer component (A) in the ABS resin (II) and a viscosity average molecular weight $[(Mv)_{PC}]$ of the thermoplastic polycarbonate (I) is represented by the following formula [11]:

$$0.7<(Mv)_{PC}/(Mn)_{ABS}<0.8 \quad [11]$$

(q) The composition described above under (n), wherein the rubbery polymer in the ABS resin (II) has an average particle size of from 0.3 to 3 μm; the polymerization step of the ABS resin (II) is conducted so as to satisfy the following formula:

$$\eta_1/\eta_2 \leq 0.98$$

wherein
  $\eta_2$ represents a reduced viscosity of the polymer component (A) available at the time of completion of the particle size adjusting substep as measured at 30° C. using dimethylformamide (DMF) as a solvent, and
  $\eta_1$ represents a reduced viscosity of a similar polymer component available at the time of completion of the particle forming substep as measured in a similar manner.

This application is based on Applications Nos. HEI-8-138453/1996, HEI-8-214585/1996, HEI-8-214586/1996, HEI-8-236593/1996, HEI-8-236594/1996 and HEI-8-237929/1996 filed May 31, 1996, Aug. 14, 1996, Aug. 14, 1996, Nov. 6, 1996, Nov. 6, 1996 and Nov. 6, 1996 in Japan, respectively, the contents of which are incorporated herein by reference.

The process according to the present invention for the production of the ABS resin is conducted by continuous bulk and/or continuous solution polymerization. The term "continuous bulk and/or continuous solution polymerization" as used herein means a polymerization process which comprises continuously feeding raw materials such as monomers to a polymerization reaction step, subjecting them to a polymerization reaction, continuously taking the resulting polymer out of the polymerization reaction step, and obtaining the polymer as a product. Such continuous polymerization is generally called "continuous solution polymerization" when a solvent is used in an amount of 30% or greater based on the polymerization reaction mixture or "continuous bulk polymerization" when a solvent is used in an amount smaller than 30% (including 0%) based on the polymerization reaction mixture. No particularly strict distinction is however needed between them in the present invention. Concerning the definition of "continuous polymerization" in the present invention, any polymerization shall be regarded as "continuous polymerization" insofar as its polymerization step is continuous even in part.

Usable examples of the styrene monomer in the present invention include styrene and its derivatives, specifically styrene, a-methylstyrene, o-methylstyrene, m-methylstyrene, p-methylstyrene, halogenated styrenes, t-butylstyrene, vinylxylene and divinylbenzene. Preferred usable examples include styrene, α-methyl-styrene and p-methylstyrene, with styrene and α-methyl-styrene being particularly preferred. They can be used either singly or in combination.

Usable examples of the acrylonitrile monomer include acrylonitrile, methacrylonitrile and α-chloro-acrylonitrile. Of these, acrylonitrile and methacrylonitrile are particularly preferred. They can be used either singly or in combination.

When only a styrene monomer and an acrylonitrile monomer are used to provide a monomer component, the weight ratio of the styrene monomer to the acrylonitrile monomer may preferably range from 90:10 to 50:50, more preferably from 85:15 to 65:35.

Illustrative of the vinyl monomer copolymerizable with at least one of the styrene monomer and the acrylonitrile monomer in the present invention are alkyl (meth)acrylate monomers such as methyl methacrylate, ethyl methacrylate, methyl acrylate, ethyl acrylate and n-butyl acrylate; maleimide monomers such as n-phenylmaleimide, n-methylphenylmaleimide, n-cyclo-hexylmaleimide and n-ethylmaleimide; and unsaturated carboxylic acid derivatives such as maleic anhydride, acrylic acid and methacrylic acid. These monomers can be omitted or can be used either singly or in combination. Use of methyl methacrylate, n-phenylmaleimide or maleic anhydride is particularly preferred. Use of methyl methacrylate leads to an ABS resin with improved transparency, use of n-phenylmaleimide provides an ABS resin improved in heat resistance, and use of maleic anhydride results in an ABS resin with improved heat resistance and weatherability. One or more of these monomers, if necessary, can be employed usually in a range of from 0 to 50 parts by weight per 100 parts by weight of the whole monomer component. The preferred weight ratio of the styrene monomer to the acrylonitrile monomer employed here is the same as that described above.

It is to be noted that a copolymer making use of a monomer other than a styrene monomer and an acrylonitrile monomer should be included in the scope of the term "ABS resin" as used herein.

No particular limitation is imposed on the rubbery polymer employed in the present invention-insofar as it exhibits rubbery properties at room temperature. Usable examples include polybutadiene, isoprene-butadiene copolymers, styrene-butadiene copolymers, acrylonitrile-butadiene copolymers, ethylene-propylene copolymers, and ethylene-propylene-diene copolymers. Preferably, a copolymer containing butadiene parts, such as polybutadiene or a styrene-butadiene copolymer, is used. The rubbery polymer can be used generally in a range of from 4 to 50 parts by weight, preferably in a range of from 4 to 20 parts by weight per 100 parts by weight of the whole monomer component employed in the polymerization.

In the present invention, the rubbery polymer may preferably comprise at least two types of styrene-butadiene copolymers (SBR) $R_1$, $R_2$ which satisfy the following formulas [7], [8] and [9]:

$$5 \leq SV_1 \leq 50, 12 \leq ST_1 \leq 30 \tag{7}$$

$$5 \leq SV_2 \leq 50, 25 \leq ST_2 \leq 50 \tag{8}$$

$$3 \leq ST_2 - ST_1 \leq 35 \tag{9}$$

wherein $SV_1$ represents a viscosity of a 5 wt. % styrene solution of the styrene-butadiene copolymer $R_1$ at 25° C. as expressed in terms of centipoises, $ST_1$ represents a content of styrene in the styrene-butadiene copolymer $R_1$ as expressed in terms of wt. %, $SV_2$ represents a viscosity of a 5 wt. % styrene solution of the styrene-butadiene copolymer $R_2$ at 25° C. as expressed in terms of centipoises, and $ST_2$ represents a content of styrene in the styrene-butadiene copolymer $R_2$ as expressed in terms of wt. %.

Block copolymers are particularly preferred as these SBRs, although they can be either random copolymers or block copolymers. As these SBRs $R_1$, $R_2$, it is particularly preferred to use those satisfying the following formulas [12], [13] and [14]:

$$5 \leq SV_1 \leq 50, 15 \leq ST_1 \leq 30 \tag{12}$$

$$5 \leq SV_2 \leq 50, 30 \leq ST_2 \leq 50 \tag{13}$$

$$5 \leq ST_2 - ST_1 \leq 35 \tag{14}$$

The SBRs $R_1$, $R_2$ can be used preferably at an amount ratio which satisfies the following formula [15]:

$$1 \leq R_1 / R_2 \leq 9 \tag{15}$$

more preferably, the following formula [16]:

$$1.5 \leq R_1 / R_2 \leq 4 \tag{16}$$

As a preferred embodiment of the present invention, the above-described two types of styrene-butadiene copolymers (SBRs) are employed as the rubbery polymer. This extremely facilitates the particle size reduction in the particle size adjusting substep, thereby making it possible to obtain an ABS resin having still better gloss and impact strength.

Further, similar advantageous effects can also be obtained by adding, in addition to the above-described two types of SBRs, 20 wt. % or less of polybutadiene, an isoprene-butadiene copolymer, or a styrene-butadiene copolymer, acrylonitrile-butadiene copolymer, ethylene-propylene copolymer or ethylene-propylene-diene copolymer other than that described above.

A polymerization initiator can be used in the present invention. Illustrative preferred polymerization initiators usable in the present invention include organic peroxides such as benzoyl peroxide, lauroyl peroxide, t-butyl peroxypivalate, t-butyl peroxybenzoate, t-butyl peroxyisobutyrate, t-butyl peroxyoctoate, cumyl peroxyoctoate, 1,1-bis(t-butyl-peroxy)-3,3,5-trimethylcyclohexane, because they facilitate achievement of high grafting degrees. More preferred usable examples include t-butyl peroxypivalate, t-butyl peroxyoctoate and 1,1-bis(t-butyl-peroxy)-3,3,5-trimethylcyclohexane. They can be used generally in a range of from 0.001 to 5.0 parts by weight, preferably in a range of from 0.001 to 3.5 parts by weight, more preferably in a range of from 0.001 to 2.0 parts by weight per 100 parts by weight of the whole monomer component employed in the polymerization.

An inert organic solvent can be used in the present invention. Usable examples of the inert organic solvent include benzene, toluene, xylene, ethylbenzene, acetone, isopropylbenzene and methyl ethyl ketone, with ethylbenzene and toluene being particularly preferred. They can be used generally in a range of from 0 to 50 parts by weight, preferably in a range of from 5 to 40 parts by weight, more preferably in a range of from 10 to 30 parts by weight per 100 parts by weight of the whole monomer component employed in the polymerization.

In the present invention, various chain transfer agents can be used in addition to the above-described inert organic solvent in order to adjust the molecular weight of the ABS resin. For example, known chemical substances such as a-methylstyrene dimer, t-dodecyl-mercaptan, n-dodecylmercaptan and n-octylmercaptan can be used. They can be used in a range of from 0.01 to 2.0 parts by weight per 100 parts by weight of the whole monomer component employed in the polymerization.

The term "particle forming substep as the first-stage polymerization substep" as used herein means a substep in which polymerization is conducted at least until particles of the rubbery polymer are formed in a polymerization mixture. This substep may preferably be conducted in a polymerization system making use of a plug flow polymerization reactor or a batch polymerization reactor, although the substep is not limited to the use of a reactor of any particular type insofar as the claimed conditions are met.

The term "plug flow reactor" as used herein does not necessarily mean a plug flow in a strict sense. For the particle forming substep, for example, examples of the plug flow reactor include a polymerization system constructed of plural, preferably 3 or more back-mixed stirred tank reactors connected in series and polymerization mixture making use of a tubular reactor or tower reactor having higher plug flow properties than a back-mixed stirred tank reactor. In particular, a polymerization system making use of 1 to 3, preferably 1 to 2 tubular reactors or tower reactors divided into plural sections by partition plates can be preferably used.

As the tower reactor, reference may be had, for example, to FIG. 7.5 on page 185 in Koji Saeki and Shinzo Omi: "Shin Polymer Seizo Processes (New Polymer Production Processes)", Kogyo Chosakai Publishing Co., Ltd. The contents of this publication are incorporated herein by reference.

When conducting polymerization in the particle. forming substep as the first-stage polymerization substep, a flow test is carried out, as will be described next, through a reactor which is provided with a feed inlet for the raw materials, which are used in the particle forming substep, and an outlet for a polymerization reaction mixture obtained subsequent to the particle forming substep and which is used for the particle forming substep between the inlet and the outlet. Plug flow properties in the reactor are determined from the results of the test.

Described specifically, a solution whose viscosity is 10 poises is fed at a flow rate of F (l/hr) into the reactor and the solution is drawn at the flow rate of, F (l/hr) from the outlet. The volume of the reactor is V (l). Here, F is set equal to V (F=V) so that the solution is allowed to continuously flow in a steady state. At a time $t_1$, the feed solution is instantaneously switched to a solution colored in red at a density of $C_o$ (%) and having a viscosity of 10 poises. A polymerization system in which at a time $t_1$ ($t_1$ is a time point upon elapsed time of 2 hours from $t_0$), the color density becomes $C_1$ (%) at the outlet [$(C_1/C_0)$>0.9] is preferred for use in the particle forming substep in the present invention. In the present invention, polymerization which satisfy these conditions is defined as "plug flow polymerization", and a reactor employed for the plug flow polymerization is defined as a "plug flow reactor". Incidentally, a plug flow reactor composed of plural reactors is preferred, although the plug flow reactor may be composed of either a single reactor or such plural reactors.

In the particle forming substep of the present invention, the substep that a polymer of the monomer component forms a continuous phase and particles of the rubbery polymers form a dispersed phase means a substep generally called a "phase inversion", that is, a substep in which, as the polymerization proceeds further and the amount of the polymer of the monomer component increases, the rubbery polymer as a continuous phase in the feed undergoes phase separation and is hence converted into rubber particles even under weak shear force of ordinary stirring.

In each of the first and second stages of the polymerization step, namely, each of the particle forming substep and the particle size adjusting substep, reactors can be used as many as desired provided that the claimed conditions are met. Hence, no particular limitation is imposed on the number of reactor(s).

In the particle forming substep, the particles of the rubbery polymer are formed in the polymerization system by using the specific reactor. The particle size adjusting substep can increase the converted amount of the monomer component into the polymer compared with that in the particle forming substep, and moreover, can further reduce the particles of the rubbery polymer, said particles having been formed in the particle forming substep, and can also control the particle size distribution of such particles.

To reduce the rubber particle size in the particle size adjusting substep, it is desired to conduct the polymerization in the particle size adjusting substep step to satisfy the following formula [1]:

$$B/A=x \qquad [1]$$

and also the following formula [2], preferably [5] and most preferably [17]:

$$16 \leq A \text{ and } 0.1 \leq x, \text{ and } 17.6 \leq A+B \leq 50 \qquad [2]$$

$$18 \leq A \text{ and } 0.1 \leq x \leq 1.5, \text{ and } 19.8 \leq A+B \leq 45 \qquad [5]$$

$$20 \leq A \text{ and } 0.1 \leq x \leq 1.2, \text{ and } 22 \leq A+B \leq 44 \qquad [17]$$

A represents a converted amount of the whole monomer component into the polymer at the time of completion of the particle forming substep in the present invention as expressed in term of parts by weight supposing that the total of a weight of an unreacted portion of the whole monomer component, a weight of the converted amount of the monomer component into the polymer and a weight of the rubbery polymer be 100 parts by weight, and B is expressed by the following formula:

$$B=C-A$$

wherein C represents a converted amount of the whole monomer into the polymer at the time of completion of the particle size adjusting substep as expressed in terms of parts by weight supposing that the total of a weight of an unreacted portion of the monomer component at the time of the completion of the particle size adjusting substep, the weight of the converted amount of the monomer component into the polymer and the weight of the rubbery polymer be 100 parts by weight.

A is preferably 16 or greater, more preferably 18 or greater, and still more preferably 20 or greater. A of 16 or greater makes it possible to form rubber particles in the particle forming substep and also to provide a molding of reduced unevenness in gloss.

When A+B is 50 or smaller, rubber particles are allowed to remain homogeneous in size, leading to a molding of reduced unevenness in gloss. When A+B is 17.6 or greater, rubber particles can be formed in the particle forming substep, also leading to a molding of reduced unevenness in gloss.

In the present invention, x is preferably at least 0.1 but at most 2.1, with a range of from 0.1 to 1.2 being more preferred and a range of from 0.1 to 0.7 being still more preferred. x of 0.1 or greater permits a particle size reduction in the particle size adjusting substep, leading to a molding of reduced unevenness in gloss. Further, x of 2.1 or smaller rubber particles are allowed to remain homogeneous in size.

The small particles formed in the particle forming substep are smoothly rendered still smaller in the particle size adjusting substep. If the average particle size $D_{P1}$ at the time of completion of the particle forming substep is 2 μm or smaller, a further particle size reduction is feasible in the particle size adjusting substep. It is therefore possible to maintain the homogeneity of the rubber particle sizes. When the ABS resin is used by itself for the production of a molding, $D_{P1}$ may therefore preferably be 2 μm or smaller, more preferably 1.4 μm or smaller. On the other hand, the lower limit of $D_{P1}$ may preferably be 0.2 μm or greater.

In addition, the average particle size $D_{P1}$ and an average particle size $Dp_2$ of the rubber particles at time of completion of the particle size adjusting substep may preferably satisfy a relationship that the logarithm of the ratio of $D_{P1}$ to $D_{P2}$ [$\log(D_{P1}/D_{P2})$] is greater than 0 but not greater than 2, preferably greater than 0 but not greater than 1, more preferably greater than 0 but not greater than 0.9. When $\log(D_{P1}/D_{P2})$ is 2 or smaller, the rubber particles are not excessively reduced in particle size and are hence allowed to maintain the homogeneity. On the other hand, $\log(D_{P1}/D_{P2})$ of 0 or smaller means $D_{P2}$ greater than $D_{P1}$, leading to a reduction in gloss.

Measurements of $D_{P1}$ and $D_{P2}$ as referred to herein are conducted as will be described next. The rubber particles in the polymerization reaction mixture at the time of completion of each of the particle forming substep and the particle size adjusting substep are united together because the polymerization degree is still low. It is therefore impossible to measure their particle sizes in such a united form. Accordingly, the polymerization reaction mixture is diluted with the same weight of an AS solution which is formed of a styrene-acrylonitrile copolymer and a mixed solvent (styrene/acrylonitrile: 3/1, by weight) in an amount twice as much as the styrene-acrylonitrile copolymer by weight, and the thus-diluted mixture is subjected to heat treatment at 100° C. for 10 hours to solidify the polymerization reaction mixture. The resulting resin is micrographed by the ultrathin sectioning technique, and the major diameters and minor diameters of 1,000 to 2,000 rubber particles in the micrograph are measured. With respect to each of the rubber particles so measured, the arithmetic mean of its major diameter and minor diameter is recorded as its particle size D. The average rubber particle size is then determined by averaging such arithmetic means in accordance with the following formula [18]:

$$\text{Average rubber particle size} = \Sigma nD^4/\Sigma nD^3 \qquad [18]$$

wherein n stands for the number of rubber particles having a particle size D.

The ratio of a particle size distribution index $I_{P1}$, which is an index of the homogeneity of particles of the rubbery polymer at the time of completion of the particle forming substep, to a particle size distribution index Ip2 at the time of completion of the particle size adjusting substep, that is, $I_{P1}/I_{P2}$ may be 15.0 or smaller, preferably 12.0 or smaller in the present invention. $I_{P1}/I_{P2}$ of 15.0 or smaller advantageously provides a molding of reduced unevenness in gloss.

Similar to the determination of $D_{P1}$ and $D_{P2}$, $I_{P1}$ and $I_{P2}$ as used herein are determined as expressed by the following formula [19]:

$$\text{Particle size distribution index} = (\Sigma nD^4/\Sigma nD^3)/(\Sigma nD^3/\Sigma nD^2) \qquad [19]$$

Further, $D_{P1}$, $D_{P2}$, $I_{P1}$ and $I_{P2}$ in the present invention can be controlled by limiting the converted amount of the monomer component into the polymer within the claimed range by using the specific reactor and preferably by using a specific rubber, although no conventional process was able to control them. It is the greatest feature of the present invention that upon production of a molding, unevenness in gloss can be reduced relying upon the homogeneity of rubber particles.

The polymerization temperature in the process of the present invention may range preferably from 50 to 180° C., more preferably from 80 to 140° C. The residence time in the particle size adjusting substep may range preferably from 0.2 to 3 hours, more preferably from 0.5 to 2.5 hours and may also be preferably 0.2 to 0.9 times, more preferably 0.4 to 0.9 times as short as the residence time in the particle forming substep.

The particle size adjusting substep is generally conducted using a back-mixed stirred tank reactor. As this back-mixed stirred tank reactor, a conventional stirred tank reactor used in the polymerization of a monomer component composed primarily of a styrene monomer can be used, and particularly strong shear force is not required. The particle size adjusting substep in the present invention exhibits different particle size adjusting effects depending on the polymerization conditions, the rubbery polymer and the like. The rubbery polymer is gathered to be formed into smaller particles from its chemical or physical relationship with the polymer formed in the particle forming step, and is not considered to be formed into smaller particles by shear force.

As a still further preferred embodiment of the present invention, it is preferred to conduct the polymerization step so that $\eta_1/\eta_2$ becomes 0.98 or smaller, preferably 0.96 or smaller, more preferably 0.94 or smaller. Here, $\eta_1$, represents a reduced viscosity of a 25° C. extract of a styrene-based copolymer from a polymerization mixture, which is available at the time of completion of the particle forming substep, in a 7:3 (by weight) mixed solvent of methyl ethyl ketone (MEK) and methanol (MeOH) as measured at 30° C. using dimethylformamide (DMF) as a solvent, and $\eta_2$ represents a reduced viscosity of a similar extract from a polymerization mixture available at the-time of completion of the particle size adjusting substep as measured in a similar manner. The lower limit of $\eta_1/\eta_2$ can be 0.5, although no particular limit is imposed thereon.

The measurements of the reduced viscosities $\eta_1/\eta_2$ as used in the present invention are conducted as will be described next. The polymerization reaction mixture available at the time of completion of each substep is dissolved at 25° C. in a 7:3 (by weight) mixed solvent of MEK and MeOH. The resultant mixture is processed by a centrifugator to remove the rubber and the styrene-based polymer grafted on the rubber. From the remaining solution, the styrene-based polymer which has not been on the rubber is collected. Using DMF as a solvent, its reduced viscosity is determined at 30° C. by solution viscometry.

Further, $\eta_1/\eta_2$ can be controlled in the present invention by using a plug flow reactor for the first-stage polymerization substep and setting the conversion rates of the respective substeps within particular ranges. According to the conventional art, $\eta_1/\eta_2$ takes a value of 1 or greater. It is the greatest feature of this embodiment that the weld strength can be improved especially by the control of $\eta_1/\eta_2$.

Incidentally, the term "weld" as used herein means a line-shaped mark which is formed on a molding due to incomplete fusion bonding at a merging place when two or more flows of a molten resin divided within a die merge together upon formation of the molding. It is also called a "weld line". The term "weld strength" as used herein indicates the falling weight impact strength at the weld.

Each molding of the ABS resin produced by the process of the present invention is provided with significantly improved weld strength while presenting a higher gloss value than those available from ABS resins produced by the conventional processes. The gloss of an ABS resin generally drops as its impact resistance is made higher. It has not been elucidated why the present invention has brought about such significantly improved weld strength while maintaining a high gloss. This may however be attributed probably to a substantial reduction in the number of non-homogeneous particles which exist while the homogeneity of rubber is low.

Further, the very high homogeneity of the rubber particles in the present invention is estimated to have led to the significant improvement in the weld strength of the molding.

The ABS resin according to the present invention is molded under conventional molding conditions. Although not intended to be limited specifically, molding is generally effected at a molding temperature of from about 200 to 240° C., preferably about 210 to 220° C. and at a mold temperature of from about 40 to 60° C., preferably about 45 to 55° C.

The ABS resin obtained by the above-described process can provide a molding which has excellent physical properties, namely, which is free of unevenness in gloss, has a high gloss uniformly and has been improved in impact strength, especially in weld strength. The ABS resin is therefore extremely useful from the industrial standpoint.

Further, the ABS resin according to the present invention can be blended especially with a polycarbonate, thereby providing an ABS-polycarbonate resin composition with excellent physical properties. The ABS resin is therefore extremely useful as a blending resin for polycarbonates.

Namely, the present invention also provides an ABS-polycarbonate resin composition comprising:
(I) 100 parts by weight of a thermoplastic polycarbonate, and
(II) 10 to 500 parts by weight of an ABS resin; wherein
  1) the ABS resin (II) is available by any one of the above-described processes (a) to (k),
  2) the ABS resin (II) comprises 5 to 30 wt. % of the rubbery polymer,
  3) a polymer component (A) in the ABS resin (II), said polymer component (A) being available by elimination of insoluble components from the ABS resin (II) through extraction of the ABS resin (II) at 25° C. with a 7:3 (by weight) mixed solvent of methyl ethyl ketone and methanol, comprises 8 to 30 wt. % of an acrylonitrile component,
  4) the polymer component (A) has a reduced viscosity ($\eta_{sp}/c$) of from 0.2 to 0.65 dl/g, and
  5) the rubbery polymer comprises at least butadiene parts, and a grafting degree of a styrene/acrylonitrile copolymer on the butadiene parts of the rubbery polymer in the ABS resin (II) ranges from 55 to 200%, preferably from 75 to 200%, more preferably from 95 to 200%.

Illustrative of the thermoplastic polycarbonate in the present invention are aromatic polycarbonates, aliphatic polycarbonates, and aliphatic-aromatic polycarbonates. These polycarbonates can be produced by known processes such as phosgenation or ester interchange or are available on the market. They generally include polymers and copolymers of bisphenols, for example, 2,2-bis(4-oxyphenyl) alkanes such as bisphenol A, bis(4-oxyphenyl) ethers, bis (4-oxyphenyl)sulfones, bis(4-oxyphenyl) sulfides and bis(4-oxyphenyl) sulfoxides. Depending on the application purpose, polymers making use of halogen-substituted bisphenols may also be included.

No particular limitation is imposed on the molecular weights of these polycarbonates, and those having weight average molecular weights (Mw) of from 5,000 to 100,000 can be preferably used. The above polycarbonate resins can be used either singly or in combination.

In the present invention, the reduced viscosity of the polymer component (A) available by elimination of insoluble components from the ABS resin, which is to be blended with the polycarbonate, through extraction of the ABS resin at 25° C. with a 7:3 (by weight) mixed solvent of methyl ethyl ketone and methanol is critical. The reduced viscosity of the ABS resin, which is to be blended in the polycarbonate in accordance with the present invention, usually falls within a lower range than that of an ABS resin to be used by itself. The reduced viscosity can be from 0.2 to 0.65 dl/g, preferably from 0.25 to 0.5 dl/g, more preferably from 0.3 to 0.45 dl/g. A reduced viscosity lower than 0.2 dl/g is not preferred, because such a low reduced viscosity leads to a substantial reduction in impact strength. On the other hand, a reduced viscosity higher than 0.65 dl/g is not preferred either because such a high reduced viscosity leads to a reduction in fluidity, a reduction in impact resistance and also a deterioration in hue.

In the present invention, the acrylonitrile component contained in the polymer component (A) in the ABS resin (II) may be from 8 to 30 wt. %, preferably from 10 to 23 wt. %, more preferably from 10 to 18 wt. %.

When blended with the polycarbonate, a content of the acrylonitrile component in the polymer (A), which is 30 wt.

% or lower, can provide a resin composition which exhibits sufficient melt fluidity and permits a good molding cycle. A content of 8 wt. % or higher provides a composition having good impact strength.

Desirably, the ABS resin (II) in the present invention is one produced by a step which comprises polymerizing a monomer component composed of at least a styrene monomer and an acrylonitrile monomer and, if necessary, a vinyl monomer copolymerizable with at least one of the above monomers—said monomer component containing a rubbery polymer, especially preferably a rubbery polymer synthesized by solution polymerization dissolved therein—by bulk and/or solution polymerization in a plug flow reactor or batch polymerization reactor at least until the rubbery polymer forms a dispersed phase preferably in the form of average particle sizes of 0.3 µm to 3 µm.

From the viewpoint of the impact strength of a molding to be obtained, it is preferred that the average particle sizes of the particles of the rubber polymer fall within the above-described range. It is particularly preferred for the composition of the present invention to use an ABS resin (II) produced from a step in which a rubbery polymer forms a dispersed phase as average particle sizes of from 0.4 µm to 1.5 µm.

A resin composition, which is composed of an ABS resin produced by bulk or solution polymerization and a polycarbonate, has conventionally been known to have excellent fluidity and impact resistance. The composition according to the present invention can exhibit outstanding low-temperature impact strength, because the ABS resin obtained by conducting the rubber particle forming substep in a plug flow polymerization reactor or a batch polymerization reactor has been uniformly subjected to the grafting reaction and the particles of the graft-reacted rubbery polymer are stable in properties.

The rubbery polymer, which is used for the production of the ABS resin (II) in the present invention, may preferably be a polymer containing at least butadiene parts, and the grafting degree of a styrene/acrylonitrile copolymer on the butadiene parts of the rubbery polymer in the ABS resin may ranges preferably from 55 to 200%, more preferably from 75 to 200%, most preferably from 95 to 200%. When the grafting degree on the butadiene parts is 55% or higher, the proportion of the resin component bonded on the rubbery polymer is adequate so that even after the formation of rubber particles, the rubber particles are less likely to undergo aggregation. The rubbery polymer therefore forms uniform, particles, resulting in high impact strength. A grafting degree of 200% or lower is preferred because sufficient fluidity is available when blended with the polycarbonate resin.

The term "grafting degree" as used herein means a value obtained by the following formula [20]:

$$G = 100(P - B)/B \quad [20]$$

wherein

G: grafting degree (%),

P: weight (g) of an insoluble matter isolated by centrifugal separation after the ABS resin is immersed at 25° C. in a 7:3 (by weight) mixed solvent of methyl ethyl ketone and methanol to dissolve a soluble matter, and B: weight (g) of the butadiene parts in the rubbery polymer.

It is not clear why the present invention has brought about a substantial improvement in low-temperature impact strength over the conventional processes. It is generally known from the past findings that use of a resin whose rubber polymer component has a lower glass transition temperature leads to an improvement in low-temperature impact strength. The improved impact strength in the present invention may probably be explained by a presumption that, upon polymerization of a styrene-based polymer in the presence of a rubbery polymer from a styrene monomer and an acrylonitrile monomer, or of a mixture thereof and a vinyl monomer copolymerizable with at least one of said monomers by bulk polymerization and/or solution polymerization, polymerization in a plug flow polymerization reactor or a batch polymerization reactor until particles of the rubbery polymer are formed in the polymerization system causes a very uniform grafting reaction to a sufficient extent and as a result, a rubbery polymer of a specific particle size and of a graft-occluded structure is formed. It is also considered that particles of the rubbery polymer, said particles being excellent in the compatibility with a polycarbonate, are formed to provide a polycarbonate-ABS resin mixture having outstandingly improved physical properties.

Among ABS-polycarbonate resin compositions according to the present invention, particularly preferred is an ABS-polycarbonate resin composition characterized in that the acrylonitrile component in the polymer component (A) available by elimination of insoluble components from the ABS resin through extraction of the ABS resin at 25° C. with a 7:3 (by weight) mixed solvent of methyl ethyl ketone and methanol ranges form 8 to 30 wt. %, the number average molecular weight of the polymer component (A) ranges from 10,000 to 40,000, and a relationship between a value of the viscosity average molecular weight $(MV)_{PC}$ of the thermoplastic polycarbonate (I) and a value of the number average molecular weight $(MN)ABS$ of the ABS resin (II) is expressed by the following formula [11]:

$$0.7 < (Mv)_{PC}/(Mn)_{ABS} < 0.8 \quad [11]$$

These polycarbonates have molecular weights in a range of from 7,000 to 32,000, preferably from 10,000 to 30,000, more preferably 15,000 to 30,000 in terms of viscosity average molecular weight (Mv). The polycarbonates can be used either singly or in combination.

Incidentally, the viscosity average molecular weight of each polycarbonate in the present invention was determined in accordance with the below-described Schnell's formula [21] [H. Schnell: Angewandte Chemie, 68, 633 (1956)] by using a value of intrinsic viscosity of a 5 g/l diluted solution of the polycarbonate in methylene chloride as a solvent measured at 20° C. by a Ubbelohde viscometer $$[\eta] = 1.23 \times 10^{-5} \, Mv \quad [21]$$

In the present invention, the number average molecular weight of the polymer component (A) available by elimination of components, which are insoluble in a 7:3 (by weight) mixed solvent of methyl ethyl ketone and methanol, from the ABS resin to be blended with the polycarbonate is critical. The number average molecular weight of the ABS resin to be blended with the polycarbonate in the present invention is generally in a range lower than that of an ABS resin to be used by itself, for example, in a range of from 10,000 to 40,000, preferably from 10,000 to 30,000. Incidentally, this number average molecular weight is determined by gel permeation chromatography. A number average molecular weight of 10,000 or greater leads to high impact strength and also to high strength at a ribbed part. On the other hand, a number average molecular weight of 40,000 or lower results in good fluidity, impact resistance and hue. The above range is therefore preferred.

In the present invention, the polymer component (A) in the ABS resin (II) is required to contain the acrylonitrile component in a proportion of from 8 to 30 wt. %, preferably from 10 to 23 wt. %, more preferably from 10 to 18 wt. %. A content of the acrylonitrile component greater than 30wt. % in the polymer component (A) leads to reduced fluidity when blended with the polycarbonate, whereby the molding cycle is deteriorated. Further, a content smaller than 8 wt. % results in reduced impact strength. Therefore, a content inside the above range is preferred.

Concerning the blending proportions of the thermoplastic polycarbonate (I) and the ABS resin (II) in the present invention, the ABS resin (II) is used in an amount of from 10 to 500 parts by weight, preferably from 30 to 400 parts by weight, more preferably from 50 to 300 parts by weight per 100 parts by weight of the thermoplastic polycarbonate (I). A blending proportion of the ABS resin (II) smaller than 10 parts by weight leads to greater thickness dependency of impact strength, while a blending proportion of the ABS resin (II) greater than 500 parts by weight results in an impairment to the inherent properties of the polycarbonate. It is also embraced within the breadth of the present invention to blend a further ABS resin or polymer or to mix an additive or the like in addition to the thermoplastic polycarbonate (I) and the ABS resin (II) as needed. Illustrative examples of the further polymer include styrene-acrylonitrile resins and elastomers.

Solution polymerization or bulk polymerization permits use of a rubbery polymer obtained by solution polymerization and having a low glass transition point. This leads to the provision of an ABS resin also improved in low-temperature impact strength.

According to the ABS resin of the present invention, no impurity like an emulsifier remains in the final product. When blended with the polycarbonate, the polycarbonate therefore remains free from deterioration, leading to improvements in heat resistance and impact resistance.

As a method for producing the composition of the present invention, the thermoplastic polycarbonate (I) and the ABS resin (II) and, if necessary, a further resin can be kneaded, for example, in a known mixer such as an extruder. In addition to the thermoplastic polycarbonate (I) and the ABS resin (II), it is also possible to use additives and polymers commonly employed in thermoplastic polymer compositions for the purpose of imparting gloss, flame retardancy, mechanical strength, chemical resistance and other properties to the resin composition, for example, known polymers such as acrylonitrile-styrene copolymers, MBS, styrene-butadiene copolymers and acrylic rubbery polymers.

A description will next be made about a still further merit of the composition according to the present invention. Conventional polycarbonate-ABS resin mixtures develop a problem that a resinous substance deposits on molds upon molding, for example, injection molding. With the composition of the present invention, such resinous deposit is substantially reduced. This is also a significant advantageous effect of the present invention.

Although no principle has been elucidated yet with respect to this advantageous effect, the low molecular weight of the polymer component (A) in the ABS resin according to the present invention and the use of the specific rubbery polymer appear to have led to the reduced production of such resinous substance.

The ABS-polycarbonate resin composition according to the present invention can be molded under conventional molding conditions. Although not intended to be bound, it may be molded at a molding temperature of from about 220 to 300° C., preferably from about 240 to 280° C. and a mold temperature of from about 50 to 80° C., preferably from about 55 to 75° C.

The ABS resin according to the present invention can provide a molding which has excellent physical properties, namely, which is free of unevenness in gloss, has a high gloss uniformly and has been improved in impact strength, especially in weld strength. The ABS-polycarbonate resin according to the present invention has excellent impact strength. The ABS resin and the ABS-polycarbonate resin composition is therefore extremely useful from the industrial standpoint.

The present invention will hereinafter be described specifically by the following examples and comparative examples. It is however to be noted that the present invention is not limited by the following examples.

Incidentally, analysis and performance evaluation of each ABS resin were conducted by the following methods:
(a) Preparation of specimens:

The resultant resin or resin composition was dried at 90° C. for 3 hours and then injection-molded at a molding temperature of 240° C. and a mold temperature of 40° C., whereby specimens of the configurations shown in FIGS. 1A and 1B were prepared for the measurement of their surface gloss and falling weight impact strength. In FIG. 1A, gate portions, in other words, inlets through which the resin or resin composition in a molten form flows into a mold are indicated by G. The positions of the gate portions appear to affect the injection molding, so that low-pressure portions to which a molding pressure cannot be applied smoothly may occur, leading to a reduction in surface gloss. Further, a weld is formed because the two gate portions are arranged at different locations.
(b) Difference in surface gloss:

A difference in surface gloss was measured following JIS K-7105. The molding of the configurations shown in FIGS. 1A and 1B was exposed 1 cm$^2$ by 1 cm$^2$ to light at an incident angle of 60°. The difference between a highest value and a lowest value is shown in Tables.
(c) Falling weight impact strength:

Following JIS K-7211, the falling weight impact strength was measured at $X_1$ and $X_2$ shown in FIG. 1A.

In the following examples, all designations of "%" mean wt. % except for those used for values of gloss.

EXAMPLE 1-1

Example 1-1 to Example 1-4 demonstrate that two-stage phase inversion in a tower reactor and a back-mix stirred tank reactor makes it possible to reduce a difference in gloss and also to improve impact strength.

Using a continuous polymerization apparatus composed of a 15-l plug flow tower reactor [a reactor of the same type as the Mitsui-Toatsu Chemicals type disclosed in FIG. 7.5(b) on page 185 in Koji Saeki and Shinzo Omi: "Shin Polymer Seizo Processes (New Polymer Production Processes)", Kogyo Chosakai Publishing Co., Ltd., said reactor being divided in 10 stages and showing $C_1/C_0$=0.955] and two 10-l back-mixed stirred tank reactors connected in series with the plug flow tower reactor, a rubber-modified styrene-based resin was produced. The plug flow tower reactor was used to perform the particle forming sub-step, the first back-mixed stirred tank reactor was employed as a second reactor to perform the particle size adjusting substep, and the second back-mixed stirred tank reactor was adapted as a third reactor to perform a post-polymerization substep.

A feed, which was composed of 54 parts by weight of styrene, 18 parts by weight of acrylonitrile, 20 parts by weight of ethylbenzene, 8 parts by weight of a rubbery polymer, 0.20 part by weight of t-dodecyl-mercaptan and 0.05 part by weight of 1,1-bis(t-butyl-peroxy)-3,3,5-trimethylcyclohexane, was continuously charged at 10 kg/hr into the plug flow tower reactor to perform polymerization of the monomers. The polymerization temperature was adjusted so that the converted amount A of the monomers into a polymer at an outlet of the plug flow tower reactor reached 25 parts by weight per 100 parts by weight of the sum of the monomers, the polymer converted from the monomers and the rubbery polymer at the time of completion of the particle forming substep. In the polymerization reaction mixture at the outlet of the plug flow tower reactor, the rubbery polymer had been converted into a dispersed phase so that particles of the rubber polymer were formed. Their average particle size $D_{pl}$ was 0.9 μm. Incidentally, employed as the rubbery polymer was a styrene-butadiene copolymer whose 5 wt. % solution in styrene had a viscosity of 15 centipoises at 25° C.

The polymerization reaction mixture was continuously taken out of the plug flow tower reactor, and was then continuously fed to the second reactor. The polymerization of the monomers was continued in the second reactor. The polymerization temperature was adjusted so that the converted amount C of the monomers into the polymer at an outlet of the second reactor reached 37.5 parts by weight per 100 parts by weight of the sum of the monomers, the polymer converted from the monomers and the rubbery polymer at the time of completion of the particle size adjusting substep. At that time, B, namely, (C-A) was 12.5 parts by weight, and the average particle size $D_{P2}$ of the rubbery polymer was 0.38 μm.

The polymerization reaction mixture, which had been continuously drawn from the second reactor, was fed to the third reactor (post-polymerization substep). As a result of the polymerization in the third reactor, the converted amount of the monomers into the polymer at an outlet of the third reactor reached 50 parts by weight per 100 parts by weight of the sum of the monomers, the polymer converted from the monomers and the rubbery polymer. The polymer was then formed into pellets through a volatile component elimination step and an extrusion step. The average particle size of the resultant product was equal to $D_{P2}$.

The polymerization conditions of the ABS resin produced as described above and the results of its analyses and performance evaluation are shown in Table 1. Compared with the results of comparative examples to be described subsequently herein, this resin developed a smaller difference in gloss at a low-pressure portion indicated on the molding of FIG. 1A. Examples 1-2 to 1-4

ABS resins were produced in exactly the same manner as in Example 1-1 except that the converted amounts A and B (A+B) of the monomers were varied as shown in Table 1. The polymerization conditions of the thus-obtained resins and the results of their analyses and performance evaluations are shown in Table 1. Comparative Examples 1-1 to 1-3.

ABS resins were produced in exactly the same manner as in Example 1-1 except that the plug flow-tower reactor was changed to a back-mixed stirred tank reactor and the converted amounts A and B (A+B) of the monomers were varied as shown in Table 1. The polymerization conditions of the thus-obtained resins and the results of their analyses and performance evaluations are shown in Table 1.

TABLE 1

|  | Example | | | | Comparative Example | | |
| --- | --- | --- | --- | --- | --- | --- | --- |
|  | 1-1 | 1-2 | 1-3 | 1-4 | 1-1 | 1-2 | 1-3 |
| A (parts by weight) | 25.0 | 21.0 | 19.0 | 17.0 | 10.0 | 23.0 | 35.0 |
| x | 0.500 | 0.905 | 1.026 | 1.176 | 2.800 | 0.565 | 0.714 |
| A + B (parts by weight) | 37.5 | 40.0 | 38.5 | 37.0 | 38.0 | 36.0 | 60.0 |
| $D_{P1}$ (μm) | 0.90 | 1.10 | 1.30 | 1.60 | — | 1.80 | 6.20 |
| Log ($D_{P1}/D_{P2}$) | 0.37 | 0.44 | 0.49 | 0.51 | — | 0.64 | −0.01 |
| Average Particle size of rubbery polymer in product (μm) | 0.38 | 0.40 | 0.42 | 0.50 | 0.51 | 0.41 | 6.35 |
| $I_{P1}/I_{P2}$ | 1.19 | 1.24 | 1.30 | 1.55 | — | 17.2 | 18.8 |
| Unevenness in gloss (%) | 7 | 9 | 11 | 12 | 35 | 33 | 46 |
| Falling weight impact strengh (cm) | 77 | 78 | 81 | 85 | 25 | 41 | 38 |

EXAMPLE 2-1

Example 2-1 to Example 2-4 demonstrate that two-stage phase inversion in a tower reactor, and a back-mixed stirred tank reactor and adequate control of $\eta_1/\eta_2$ make it possible to reduce a difference in gloss, to improve impact strength and also to provide a molding with improved weld strength.

Using a continuous polymerization apparatus composed of a 15-l plug flow tower reactor [a reactor of the same type as the Mitsui-Toatsu Chemicals type disclosed in FIG. 7.5(b) on page 185 in Koji Saeki and Shinzo Omi: "Shin Polymer Seizo Processes (New Polymer Production Processes)", Kogyo Chosakai Publishing Co., Ltd., said reactor having been divided in 10 stages and having showed $C_1/C_0=0.975$] and two 10-l back-mixed stirred tank reactors connected in series with the plug flow tower reactor, a rubber-modified styrene-based resin was produced. The plug flow tower reactor was used to perform a particle forming sub-step, the first back-mixed stirred tank reactor was employed as a second reactor to perform a particle size adjusting substep, and the second back-mixed stirred tank reactor was adapted as a third reactor to perform a post-polymerization substep.

A feed, which was composed of 54 parts by weight of styrene, 18 parts by weight of acrylonitrile, 20 parts by weight of ethylbenzene, 8 parts by weight of a rubbery polymer, 0.20 part by weight of t-dodecyl-mercaptan and 0.05 part by weight of 1,1-bis(t-butyl-peroxy)-3,3,5-trimethylcyclohexane, was continuously charged at 10 kg/hr into the plug flow tower reactor to perform polymerization of the monomers. The polymerization temperature was adjusted so that the converted amount A of the monomers into a polymer at an outlet of the plug flow tower reactor reached 25 parts by weight per 100 parts by weight of the sum of the monomers, the polymer converted from the monomers and the rubbery polymer at the time of completion of the particle forming substep. In the polymerization reaction mixture at the outlet of the plug flow tower reactor, the rubbery polymer had been converted into a dispersed phase so that particles of the rubber polymer were formed. Their average particle size $D_{P1}$ was 0.86 μm. Further, the reduced viscosity $\eta_1$, was 0.70 dl/g.

Employed as the rubbery polymer was a styrene-butadiene copolymer whose 5 wt. % solution in styrene had a viscosity of 11 centipoises at 25° C.

The polymerization reaction mixture was continuously taken out of the plug flow tower reactor, and was then continuously fed to the second reactor. The polymerization of the monomers was continued in the second reactor. The polymerization temperature was adjusted so that the converted amount C of the monomers into the polymer at an outlet of the second reactor reached 37.5 parts by weight per 100 parts by weight of the sum of the monomers, the polymer converted from the monomers and the rubbery polymer at the time of completion of the particle size adjusting substep. At that time, B, namely, (C-A) was 12.5 parts by weight, and the average particle size $D_{P2}$ of the rubbery polymer was 0.37 μm. Further, the reduced viscosity $\eta_2$ was 0.72 dl/g, thereby giving $\eta_1/\eta_2=0.97$.

The polymerization reaction mixture, which had been continuously drawn from the second reactor, was fed to the third reactor (post-polymerization substep). As a result of the polymerization in the third reactor, the converted amount of the monomers into the polymer at an outlet of the third reactor reached 50 parts by weight per 100 parts by weight of the sum of the monomers, the polymer converted from the monomers and the rubbery polymer. The polymer was then formed into pellets through a volatile component elimination step and an extrusion step. The average particle size of the resultant product was equal to $D_{P2}$.

The polymerization conditions of the ABS resin produced as described above and the results of its analyses and performance evaluation are shown in Table 2. Compared with the results of comparative examples to be described subsequently herein, this resin gave high falling weight impact strength at a weld indicated on the molding of FIG. 1A.

EXAMPLES 2-2 to 2-4

Rubber-modified styrene resins were produced in exactly the same manner as in Example 2-1 except that the converted amounts A and B (A+B) of the monomers were varied as shown in Table 2. The polymerization conditions of the thus-obtained resins and the results of their analyses and performance evaluations are shown in Table 2.

COMPARATIVE EXAMPLES 2-1 to 2-3

Rubber-modified styrene resins were produced in exactly the same manner as in Example 2-1 except that the plug flow tower reactor was changed to a back-mixed stirred tank reactor and the converted amounts A and B (A+B) of the monomers were varied as shown in Table 1 to change $\eta_1/\eta_2$. The polymerization conditions of the thus-obtained resins and the results of their analyses and performance evaluations are shown in Table 2.

TABLE 2

|  | Example | | | | Comparative Example | | |
| --- | --- | --- | --- | --- | --- | --- | --- |
|  | 2-1 | 2-2 | 2-3 | 2-4 | 2-1 | 2-2 | 2-3 |
| A (parts by weight) | 25.0 | 21.0 | 19.0 | 17.0 | 10.0 | 23.0 | 35.0 |
| x | 0.500 | 0.905 | 1.026 | 1.176 | 2.800 | 0.565 | 0.714 |
| A + B (parts by weight) | 37.5 | 40.0 | 38.5 | 37.0 | 38.0 | 36.0 | 60.0 |
| $D_{P1}$ (μm) | 0.86 | 1.05 | 1.21 | 1.48 | — | 1.70 | 5.90 |
| Log ($D_{P1}/D_{P2}$) | 0.37 | 0.43 | 0.47 | 0.49 | — | 0.63 | −0.01 |
| Average Particle size of rubbery polymer in product (μm) | 0.37 | 0.39 | 0.41 | 0.48 | 0.49 | 0.40 | 6.10 |
| $\eta_1/\eta_2$ | 0.97 | 0.95 | 0.93 | 0.92 | 1.11 | 1.09 | 1.17 |
| Gloss (%) | 97 | 96 | 94 | 93 | 65 | 73 | 32 |
| Weld strength (cm) | 67 | 68 | 71 | 75 | 21 | 38 | 28 |

EXAMPLES 3-1 to 3-4

Examples 3-1 to 3-4 demonstrate that use of two specific rubber components, two-stage phase reversal of an emulsion in a tower reactor and adequate control of $\eta_1/\eta n_2$ make it possible to provide a high gloss, to reduce a difference in gloss, to improve impact strength further and also to provide a molding with improved weld strength.

In each example, polymerization was conducted in a similar manner as in Example 1-1 except that two or three rubbery polymers different in viscosity and styrene content were used as shown in Table 4. The results are shown in Table 3.

REFERENTIAL EXAMPLE 3-1

Results of polymerization conducted by using only one type of rubbery polymer as indicated in the procedures of Example 1-1 are shown in Table 3 for reference.

TABLE 3

|  | Example | | | | Ref. Ex. |
| --- | --- | --- | --- | --- | --- |
|  | 3-1 | 3-2 | 3-3 | 3-4 | 3-1 |
| $R_1\left(\dfrac{SV_1}{ST_1}\bigg\|\%\right)$ | $\dfrac{20}{20}\bigg\|60$ | $\dfrac{20}{20}\bigg\|80$ | $\dfrac{20}{20}\bigg\|90$ | $\dfrac{20}{20}\bigg\|70$ | $\dfrac{20}{20}\bigg\|100$ |
| $R_2\left(\dfrac{SV_2}{ST_2}\bigg\|\%\right)$ | $\dfrac{40}{40}\bigg\|40$ | $\dfrac{40}{40}\bigg\|20$ | $\dfrac{40}{40}\bigg\|10$ | $\dfrac{40}{40}\bigg\|20$ | — |

TABLE 3-continued

|  | Example | | | | Ref. Ex. |
|---|---|---|---|---|---|
|  | 3-1 | 3-2 | 3-3 | 3-4 | 3-1 |
| $R_3\left(\left\|\dfrac{SV_3}{ST_3}\right\|\%\right)$ | — | — | — | $\dfrac{40}{0}$ 10 | — |
| Average Particle size of rubbery polymer in product (μm) | 0.37 | 0.33 | 0.34 | 0.37 | 0.38 |
| Gloss (%) | 97 | 99 | 98 | 97 | 91 |
| Unevenness in gloss (%) | 4 | 3 | 6 | 4 | 7 |
| Weld strength (cm) | 76 | 79 | 77 | 81 | 60 |
| Falling weight impact strength (cm) | 86 | 88 | 87 | 91 | 77 |

The subsequent examples and comparative examples show the results of experiments on ABS-polycarbonate resin compositions. Methods employed in these examples and comparative examples for the evaluation of the resin compositions will be described next.

(1) Measurement of impact strength:

A specimen was cut out from each molding, and its impact strength was measured by the Izod impact testing method (ASTM D-256).

(2) Measurement of withstandable highest temperature:

Using a specimen cut out from a molding, its Vicat softening point was determined following ASTM D-1525.

(3) Observation of deposit on a mold:

After completion of 250 shots at a molding machine cylinder temperature of 260° C. and a mold temperature of 50° C., the mold was visually observed for any deposit inside a vent,hole of the mold. The resin composition was determined to be "acceptable" when no deposit was observed but was determined to be "unacceptable" when some deposit was observed.

(4) Rib strength:

A molding was formed with a rib of 20 mm in height and 50 mm in width. The molding was pushed down with the rib positioned on a lower side. The resin composition was evaluated to be "acceptable" when the rib did not develop cracks but was evaluated to be "unacceptable" when the rib developed cracks.

EXAMPLE 4-1

[Thermoplastic polycarbonate (I)]

A commercially-available polycarbonate-based polymer (PC-1) was employed. Its characteristic properties are shown in Table 4.

TABLE 4

|  | Melt flow rate (g/10 min) | Vicat softening point (° C.) |
|---|---|---|
| PC-1 | 2.6* Mv = 50,000 | 150.8 |

*Measurement conditions: 280° C., 2.16 kg.

[Production of ABS polymer (II)]

Using a continuous polymerization apparatus composed of a 15-l plug flow tower reactor [a reactor of the same type as the Mitsui-Toatsu Chemicals type disclosed in FIG. 7.5(b) on page 185 in Koji Saeki and Shinzo Omi: "Shin Polymer Seizo Processes (New Polymer Production Processes)", Kogyo Chosakai Publishing Co., Ltd., said reactor being divided in 10 stages and having showed $C_1/C_0=0.955$ in a plug flow test], as a first reactor, and three 10-l back-mixed stirred tank reactors connected in series with the plug flow tower reactor, an ABS resin was produced. The plug flow tower reactor, as the first reactor, was used to perform a rubber particle forming sub-step, the first back-mixed stirred tank reactor was employed as a second reactor to perform a particle size adjusting substep, and the third and subsequent reactors were adapted to perform a post-polymerization substep.

A feed, which was composed of 56 parts by weight of styrene, 20 parts by weight of acrylonitrile, 16 parts by weight of ethylbenzene, 8 parts by weight of a rubbery polymer (a styrene-butadiene copolymer whose 5 wt. % solution in styrene had a viscosity of 11 centipoises at 25° C.), 0.15 part by weight of t-dodecyl-mercaptan and 0.05 part by weight of 1,1-bis(t-butyl-peroxy)-3,3,5-trimethylcyclohexane, was continuously charged at 10 kg/hr into the plug flow reactor to perform polymerization of the monomers. The polymerization temperature was adjusted so that the converted amount of the monomers into a polymer at an outlet of the plug flow reactor reached 20 parts by weight per 100 parts by weight of the sum of the monomers, the polymer converted from the monomers and the rubbery polymer at the time of completion of the particle forming substep. The polymerization temperature and residence time in the reactor were set at 88° C. and 1.6 hours, respectively. In the polymerization reaction mixture at the outlet of the plug flow reactor, the rubbery polymer had been converted into a dispersed phase so that rubbery particles were formed. Their average particle size $D_{P1}$ was 1.0 μm. The reduced viscosity $\eta_1$ of the polymer component available by elimination of insoluble components from the polymerization reaction mixture through its extraction at 25° C. with a 7:3 (by weight) mixed solvent of methyl ethyl ketone and methanol was 0.49 dl/g.

The polymerization reaction mixture was continuously fed to the second reactor. The polymerization of the monomers was continued in the second reactor. The polymerization temperature and residence time were controlled at 100° C. and 0.8 hours, respectively, so that the converted amount of the monomers into the polymer at an outlet of the second reactor reached 29 parts by weight per 100 parts by weight of the sum of the monomers, the polymer converted from the monomers and the rubbery polymer at the time of completion of the particle size adjusting substep. From the second reactor, the polymerization reaction mixture was continuously drawn. The average particle size $Dp_2$ of rubbery particles in the polymerization reaction mixture was 0.7 μm. The reduced viscosity $\eta_2$ of the polymer component available by elimination of insoluble components from the polymerization reaction mixture through its extraction at 25° C. with a 7:3 (by weight) mixed solvent of methyl ethyl ketone and methanol was 0.51 dl/g. The $\eta_1/\eta_2$ of the polymer component was 0.97.

The polymerization reaction mixture was fed to the third reactor (post-polymerization substep). As a result of polymerization in the third and fourth reactors, the converted amount of the monomers into the polymer at an outlet of the fourth reactor reached 40 parts by weight per 100 parts by weight of the sum of the monomers, the polymer converted from the monomers and the rubbery polymer. Incidentally, the third reactor was set at a temperature of 125° C. and a residence time of 0.8 hour, while the fourth reactor was set at a temperature of 140° C. and a residence time of 1.0 hour. The polymerization reaction mixture was then guided to a separation and recovery step which used a preheater and a vacuum chamber. A resin obtained from the recovery step was processed in an extrusion step, whereby an ABS resin was obtained as granular pellets. A polymer component (A) in the thus-obtained ABS resin had a reduced viscosity of 0.51 dl/g, an acrylonitrile compound content of 25%, a grafting degree of 128% and a rubbery polymer content of 18%. The average particle size of the rubbery polymer component was 0.7 μm.

[Polycarbonate-ABS resin composition]

In an extruder, 100 parts by weight of the above-described polycarbonate, 100 parts by weight of the ABS resin obtained as described above and 0.2 part by weight of an antioxidant were mixed at 260° C. The results are shown in Tables 5-1 and 5-2. Before the extrusion, the ABS resin and the polycarbonate were both subjected to drying at 100° C. for 12 hours.

EXAMPLE 4-2

The procedures of Example 4-1 were repeated except that 100 parts by weight of the polycarbonate of Example 4-1 and 67 parts by weight of the ABS resin obtained in Example 4-1 were blended. The results are shown in Tables 5-1 and 5-2.

EXAMPLE 4-3

An ABS resin was produced in exactly the same manner as in Example 4-1 except that the converted amount of the monomers was varied. The results of analyses and performance evaluation of the thus-obtained resin are shown in Tables 5-1 and 5-2.

EXAMPLE 4-4

Prepared was a feed solution which was composed of 68 parts by weight of styrene, 11 parts by weight of acrylonitrile, 11 parts by weight of ethylbenzene, 10 parts by weight of a rubbery polymer (a styrene-butadiene block copolymer having a solution viscosity of 11 cst as measured at 25° C. in the form of a 5% styrene solution), 0.045 part by weight of an organic peroxide [1,1-bis(t-butyl-peroxy)-3,3,5-trimethyl-cyclohexane] and 0.2 part by weight of tertiary dodecylmercaptan. Polymerization was then conducted in a similar manner as in Example 4-1.

A polymer component (A) in the thus-obtained ABS resin had a reduced viscosity of 0.38 dl/g, an acrylonitrile compound content of 13%, and a grafting degree of 113%. The rubbery polymer component had an average particle size of 0.9 μm, and its content was 21%. Blending of the polycarbonate with the ABS resin was conducted in the same manner as in Example 4-1. The results are shown in Tables 5-1 and 5-2.

EXAMPLE 4-5

The procedures of Example 4-1 were repeated except for the use of a feed solution composed of 62 parts by weight of styrene, 8 parts by weight of acrylonitrile, 20 parts by weight of ethylbenzene, 10 parts of a rubbery polymer (of the same type as that employed in Example 4-1), 0.05 part by weight of an organic peroxide (of the same type as that employed in Example 4-1) and 0.18 part by weight of tertiary dodecylmercaptan.

A polymer component (A) in the thus-obtained ABS resin had a reduced viscosity of 0.45 dl/g, an acrylonitrile compound content of 10%, and a grafting degree of 120%. The rubbery polymer component had an average particle size of 0.6 μm, and its content was 22%. With 100 parts by weight of the polycarbonate, 67 parts by weight of the thus-obtained ABS resin were blended. The results are shown in Tables 5-1 and 5-2.

EXAMPLE 4-6

An ABS resin was obtained in the same manner as in Example 4-1 except for the use of a feed solution composed of 63 parts by weight of styrene, 13 parts by weight of acrylonitrile, 15 parts by weight of ethylbenzene, 9 parts by weight of a rubbery polymer (of the same type as that employed in Example 4-1), 0.049 part by weight of an organic peroxide (of the same type as that employed in Example 4-1) and 0.255 part by weight of tertiary dodecylmercaptan. A polymer component (A) in the thus-obtained ABS resin had a reduced viscosity of 0.27 dl/g, an acrylonitrile compound content of 16%, and a grafting degree of 115%. The rubbery polymer component had an average particle size of 2.2 μm, and its content was 19%. With 100 parts by weight of the polycarbonate, 150 parts by weight of the thus-obtained ABS resin were blended. The results are shown in Tables 5-1 and 5-2.

EXAMPLE 4-7

The procedures of Example 4-1 were repeated except for the use of a feed solution composed of 58 parts by weight of styrene, 14 parts by weight of acrylonitrile, 20 parts by weight of ethylbenzene, 8 parts of a rubbery polymer (a styrene-butadiene block copolymer having a solution viscosity of 30 cSt as measured at 25° C. in the form of a 5% styrene solution), and 0.24 part by weight of tertiary dodecylmercaptan. A polymer component (A) in the thus-obtained ABS resin had a reduced viscosity of 0.29 dl/g, an acrylonitrile compound content of 17%, and a grafting degree of 130%. The rubbery polymer component had an average particle size of 1.1 μm, and its content was 18%. Blending of the polycarbonate with the ABS resin was conducted in the same manner as in Example 4-1. The results are shown in Tables 5-1 and 5-2.

TABLE 5-1

|  |  | Unit | Example |  |  |  |  |  |  |
|  |  |  | 4-1 | 4-2 | 4-3 | 4-4 | 4-5 | 4-6 | 4-7 |
| --- | --- | --- | --- | --- | --- | --- | --- | --- | --- |
| ABS resin | Rubbery polymer particle forming step |  | Plug flow | Plug flow | Plug flow | Plug flow | Plug flow | Plug flow | Plug flow |
|  | Content of acrylonitrile compound in (A) | % | 25 | 25 | 24 | 13 | 10 | 16 | 17 |
|  | Reduced viscosity | dl/g | 0.51 | 0.51 | 0.32 | 0.38 | 0.45 | 0.27 | 0.29 |
|  | $\eta_1/\eta_2$ |  | 0.97 | 0.97 | 0.94 | 0.95 | 0.96 | 0.95 | 0.95 |

TABLE 5-1-continued

|  | Unit | Example 4-1 | 4-2 | 4-3 | 4-4 | 4-5 | 4-6 | 4-7 |
|---|---|---|---|---|---|---|---|---|
| Grafting degree | % | 128 | 128 | 142 | 113 | 120 | 115 | 130 |
| Content of rubbery polymer | % | 18 | 18 | 23 | 21 | 22 | 19 | 18 |
| $D_{P1}$ | μm | 1.51 | 1.51 | 1.70 | 1.95 | 1.33 | 3.0 | 1.9 |
| Average Rubber particle size (=$D_{P2}$) | μm | 0.70 | 0.70 | 0.80 | 0.90 | 0.60 | 2.2 | 1.1 |
| $Log(D_{P1}/D_{P2})$ |  | 0.33 | 0.33 | 0.33 | 0.34 | 0.35 | 0.13 | 0.24 |
| A | % | 20 | 20 | 25 | 20 | 20 | 20 | 20 |
| x |  | 0.45 | 0.45 | 0.50 | 0.45 | 0.45 | 0.45 | 0.45 |
| A + B | % | 29 | 29 | 37.5 | 29 | 29 | 29 | 29 |

TABLE 5-2

|  |  | Unit | Example 4-1 | 4-2 | 4-3 | 4-4 | 4-5 | 4-6 | 4-7 |
|---|---|---|---|---|---|---|---|---|---|
| Physical properties of polycarbonate-mixed composition | PC/ABS ratio | Parts by weight | 100/100 | 100/67 | 100/100 | 100/100 | 100/67 | 100/150 | 100/100 |
|  | Melt flow rate | g/10 min | 25 | 27 | 48 | 45 | 31 | 55 | 49 |
|  | Izod impact strength 23° C. (thickness: 3.2 mm) | kg · cm/cm | 87 | 85 | 75 | 93 | 89 | 65 | 98 |
|  | −30° C. |  | 67 | 58 | 69 | 60 | 57 | 50 | 64 |
|  | Vicat softening point | ° C. | 130 | 139 | 132 | 131 | 139 | 120 | 131 |
|  | Deposit on mold |  | Acceptable | Acceptable | Acceptable | Acceptable | Acceptable | Acceptable | Acceptable |

COMPARATIVE EXAMPLE 4-1

Emulsion polymerization was conducted using polybutadiene latex, styrene and acrylonitrile in proportions of 30 parts by weight (as solids), 35 parts by weight and 5 parts by weight, respectively. Latex of the resultant graft copolymer was coagulated with dilute sulfuric acid, washed and then filtered. The coagulum so formed was then dried. A polymer component (A) in the thus-obtained ABS resin had a reduced viscosity of 0.49 dl/g, an acrylonitrile compound content of 18%, and a grafting degree of 45%. Blending of the polycarbonate with the ABS resin was conducted in the same manner as in Example 4-1. The results are shown in Tables 6-1 and 6-2.

COMPARATIVE EXAMPLE 4-2

An ABS resin was produced in exactly the same manner as in Example 4-1 except for the use of a continuous polymerization apparatus which only the three back-mixed stirred tank reactors were connected together in series without the plug flow reactor as the first reactor. The results of analyses and performance evaluations of the thus-obtained resin are shown in Tables 6-1 and 6-2.

TABLE 6-1

|  |  | Unit | Comparative Example 4-1 | 4-2 |
|---|---|---|---|---|
| ABS resin | Dispersed rubber phase forming step |  | Emulsion polymerization | Continuous polymerization |
|  | Content of acrylonitrile compound in (A) | % | 18 | 24 |
|  | Reduced viscosity | d/g | 0.49 | 0.50 |
|  | Grafting degree | % | 45 | 72 |
|  | Content of rubber polymer | % |  | 13 |
|  | $D_{P1}$ | μm |  | 0.68 |
|  | Average Rubber particle size (=$D_{P2}$) | μm |  | 0.7 |
|  | $Log(D_{P1}/D_{P2})$ |  |  | −0.01 |
|  | $I_1/I_2$ |  |  | 1.25 |
|  | A | % |  | 20 |
|  | x |  |  | 0.45 |
|  | A + B | % |  | 29 |

TABLE 6-2

|  |  | Unit | Comparative Example 4-1 | Comparative Example 4-2 |
|---|---|---|---|---|
| PC/ABS ratio |  | Parts by weight | 100/100 | 100/100 |
| Melt Flow rate |  | g/10 min | 38 | 22 |
| Physical properties of polycarbonate-mixed composition | Izod impact strength (thickness: 3.2 mm) 23° C. | kg · cm/cm | 35 | 76 |
|  | −30° C. |  | 6 | 30 |
|  | Vicat softening point | ° C. | 131 | 130 |
|  | Deposit on mold |  | Unacceptable | Acceptable |

EXAMPLE 5
[Thermoplastic polycarbonates (I)]

The BPA-base polycarbonate polymers (PC-2, PC-3, PC-4) shown in Table 7 were provided for selective use in Examples 5-1 to 5-5 and Comparative Examples 5-1 to

TABLE 7

|  | Viscosity average molecular weight |
|---|---|
| PC-2 | 12,500 |
| PC-3 | 16,000 |
| PC-4 | 22,000 |

EXAMPLE 5-1
[Production of ABS polymer (II)]

Using a continuous polymerization apparatus composed of a 15-l plug flow tower reactor [a reactor of the same type as the Mitsui-Toatsu Chemicals type disclosed in FIG. 7.5(b) on page 185 in Koji Saeki and Shinzo Omi: "Shin Polymer Seizo Processes (New Polymer Production Processes)", Kogyo Chosakai Publishing Co., Ltd., said reactor being divided in 10 stages and having showed $C_1/C_0=0.975$ in a plug flow test], as a first reactor, and three 10-l back-mixed stirred tank reactors connected in series with the plug flow tower reactor, an ABS resin was produced. The plug flow tower reactor, as the first reactor, was used to perform a rubber particle forming sub-step, the first back-mixed stirred tank reactor was employed as a second reactor to perform a particle size adjusting substep, and the third and subsequent reactors were adapted to perform a post-polymerization substep.

A feed, which was composed of 56 parts by weight of styrene, 20 parts by weight of acrylonitrile, 16 parts by weight of ethylbenzene, 8 parts by weight of a rubbery polymer (a styrene-butadiene copolymer whose 5 wt. % solution in styrene had a viscosity of 11 centipoises at 25° C.), 0.15 part by weight of t-dodecylmercaptan and 0.05 part by weight of 1,1-bis(t-butyl-peroxy)-3,3,5-trimethylcyclohexane, was continuously charged at 10 kg/hr into the plug flow reactor to perform polymerization of the monomers. The polymerization temperature was adjusted so that the converted amount of the monomers into a polymer at an outlet of the plug flow reactor reached 20 parts by weight per 100 parts by weight of the sum of the monomers, the polymer converted from the monomers and the rubbery polymer at the time of completion of the particle forming substep. The polymerization temperature and residence time in the reactor were set at 88° C. and 1.8 hours, respectively. In the polymerization reaction mixture at the outlet of the plug flow reactor, the rubbery polymer had been converted into a dispersed phase so that rubbery particles were formed.

Their average particle size $D_{p1}$ was 1.2 μm. The reduced viscosity $\eta_1$ of the polymer component available by elimination of insoluble components from the polymerization reaction mixture through its extraction at 25° C. with a 7:3 (by weight) mixed solvent of methyl ethyl ketone and methanol was 0.49 dl/g.

The polymerization reaction mixture was continuously fed to the second reactor. The polymerization of the monomers was continued in the second reactor. The polymerization temperature and residence time were controlled at 110° C. and 0.8 hours, respectively, so that the converted amount of the monomers into the polymer at an outlet of the second reactor reached 29 parts by weight per 100 parts by weight of the sum of the monomers, the polymer converted from the monomers and the rubbery polymer at the time of completion of the particle size adjusting substep. From the second reactor, the polymerization reaction mixture was continuously drawn. The average particle size $D_{P2}$ of rubbery particles in the polymerization reaction mixture was 0.7 Am. The reduced viscosity $\eta_2$ of the polymer component available by elimination of insoluble components from the polymerization reaction mixture through its extraction at 25° C. with a 7:3 (by weight) mixed solvent of methyl ethyl ketone and methanol was 0.51 dl/g. The $\eta_1/\eta_2$ of the polymer component was 0.97.

The polymerization reaction mixture was fed to the third reactor (post-polymerization substep). As a result of polymerization in the third and fourth reactors, the converted amount of the monomers into the polymer at an outlet of the fourth reactor reached 40 parts by weight per 100 parts by weight of the sum of the monomers, the polymer converted from the monomers and the rubbery polymer. Incidentally, the third reactor was set at a temperature of 125° C. and a residence time of 0.8 hour, while the fourth reactor was set at a temperature of 140° C. and a residence time of 1.0 hour. The polymerization reaction mixture was then guided to a separation and recovery step which used a preheater and a vacuum chamber. A resin obtained from the recovery step was processed in an extrusion step, whereby an ABS resin was obtained as granular pellets. A polymer component (A) in the thus-obtained ABS resin had an average molecular weight of 31,000 as determined by GPC, an acrylonitrile compound content of 25%, a grafting degree of 128% and a rubbery polymer content of 18%. The average particle size of the rubbery polymer component was 0.7 μm.

[Polycarbonate-ABS resin composition]

In an extruder, 100 parts by weight of the above-described polycarbonate, 100 parts by weight of the ABS resin obtained as described above and 0.2 part by weight of an antioxidant were mixed at 260° C. The results are shown in Tables 8-1 and .8-2. Before the extrusion, the ABS resin and the polycarbonate were both subjected to drying at 100° C. for 12 hours.

EXAMPLE 5-2

The procedures of Example 5-1 were repeated except that 100 parts by weight of the polycarbonate of Example 5-1 and 67 parts by weight of the ABS resin obtained in Example 5-1 were blended. The results are shown in Tables 8-1 and 8-2.

EXAMPLE 5-3

An ABS resin was produced in exactly the same manner as in Example 5-1 except that the converted amount of the monomers was varied. The results of analyses and performance evaluation of the thus-obtained resin are shown in Tables 8-1 and 8-2.

EXAMPLE 5-4

Prepared was a feed solution which was composed of 68 parts by weight of styrene, 11 parts by weight of acrylonitrile, 11 parts by weight of ethylbenzene, 10 parts by weight of a rubbery polymer (a styrene-butadiene block copolymer having a solution viscosity of 11 cSt as measured at 25° C. in the form of a 5% styrene solution), 0.045 part by weight of an organic peroxide [1,1-bis(t-butyl-peroxy)-3,3,5-trimethyl-cyclohexane] and 0.2 part by weight of tertiary dodecylmercaptan. Polymerization was then conducted in a similar manner as in Example 5-1.

A polymer component (A) in the thus-obtained ABS resin had a number average molecular weight of 21,000, an acrylonitrile compound content of 13%, and a grafting degree of 113%. The rubbery polymer component had an average particle size of 0.9 µm, and its content was 21%. Blending of the polycarbonate with the ABS resin was conducted in the same manner as in Example 5-1. The results are shown in Tables 8-1 and 8-2.

EXAMPLE 5-5

The procedures of Example 5-1 were repeated except for the use of a feed solution composed of 62 parts by weight of styrene, 8 parts by weight of acrylonitrile, 20 parts by weight of ethylbenzene, 10 parts of a rubbery polymer (of the same type as that employed in Example 5-1), 0.05 part by weight of an organic peroxide (of the same type as that employed in Example 5-1) and 0.18 part by weight of tertiary dodecylmercaptan.

A polymer component (A) in the thus-obtained ABS resin had a number average molecular weight of 28,000, an acrylonitrile compound content of 10%, and a grafting degree of 120%. The rubbery polymer component had an average particle size of 0.6 µm, and its content was 22.0%. With 100 parts by weight of the polycarbonate, 67 parts by weight of the thus-obtained ABS resin were blended. The results are shown in Tables 8-1 and 8-2.

COMPARATIVE EXAMPLE 5-1

An ABS resin was obtained in the same manner as in Example 5-1 except for the use of a feed solution composed of 58 parts by weight of styrene, 14 parts by weight of acrylonitrile, 20 parts by weight of ethylbenzene, 8 parts by weight of a rubbery polymer (a styrene-butadiene block copolymer having a solution viscosity of 30 cSt as measured at 25° C. in the form of a 5% styrene solution) and 0.24 part by weight of tertiary dodecylmercaptan. A polymer component (A) in the thus-obtained ABS resin had a number average molecular weight of 12,000, an acrylonitrile compound content of 17%, and a grafting degree of 130%. The rubbery polymer component had an average particle size of 1.1 µm, and its content was 18%. Blending of the polycarbonate with the ABS resin was conducted in the same manner as in Example 5-1. The results are shown in Tables 8-1 and 8-2.

COMPARATIVE EXAMPLE 5-2

An ABS resin was produced in exactly the same manner as in Example 5-1 except for the use of a continuous polymerization apparatus which only the three back-mixed stirred tank reactors were connected together in series without the plug flow reactor as the first reactor. The results of analyses and performance evaluations of the thus-obtained resin are shown in Tables 8-1 and 8-2.

COMPARATIVE EXAMPLE 5-3

Emulsion polymerization was conducted using polybutadiene latex, styrene and acrylonitrile in proportions of 30 parts by weight (as solids), 35 parts by weight and 5 parts by weight, respectively. Latex of the resultant graft copolymer was coagulated with dilute sulfuric acid, washed and then filtered. The coagulum so formed was then dried. A polymer component (A) in the thus-obtained copolymer had a number average molecular weight of 29,000, an acrylonitrile compound content of 18%, and a grafting degree of 45%. Blending of the polycarbonate with the ABS resin was conducted in the same manner as in Example 5-1. The results are shown in Tables 8-1 and 8-2.

TABLE 8-1

| | | | Example | | | | | Comparative Example | | |
|---|---|---|---|---|---|---|---|---|---|---|
| | | Unit | 5-1 | 5-2 | 5-3 | 5-4 | 5-5 | 5-1 | 5-2 | 5-3 |
| ABS resin | Content of acrylonitrile compound in (A) | % | 25 | 25 | 24 | 13 | 10 | 17 | 24 | 18 |
| | Number average molecular weight | | 31000 | 31000 | 16000 | 21000 | 28000 | 12000 | 34000 | 29000 |
| | Grafting degree | % | 112 | 112 | 107 | 113 | 120 | 130 | 98 | 45 |
| | Content of rubber polymer | % | 18 | 18 | 24 | 21 | 22 | 18 | 16 | |
| | $D_{P1}$ | µm | 1.51 | 1.51 | 1.70 | 1.95 | 1.33 | 4.5 | 0.9 | |
| | Average Rubber particle size (=$D_{P2}$) | µm | 0.8 | 0.9 | 0.6 | | 1.1 | 0.9 | | |
| | $Log(D_{P1}/D_{P2})$ | | 0.33 | 0.33 | 0.13 | 0.34 | 0.35 | 0.61 | 0 | |
| | A | % | 20 | 20 | 25 | 20 | 20 | 20 | 20 | |
| | x | | 0.45 | 0.45 | 0.50 | 0.45 | 0.45 | 0.45 | 0.45 | |

TABLE 8-1-continued

|  | Unit | Example | | | | | Comparative Example | | |
|---|---|---|---|---|---|---|---|---|---|
|  |  | 5-1 | 5-2 | 5-3 | 5-4 | 5-5 | 5-1 | 5-2 | 5-3 |
| A + B | % | 29 | 29 | 37.5 | 29 | 29 | 29 | 29 |  |
| $\eta_1/\eta_2$ |  | 0.97 | 0.97 | 0.94 | 0.95 | 0.96 | 0.95 | 1.23 |  |

TABLE 8-2

|  |  | Unit | Example | | | | | Comparative Example | | |
|---|---|---|---|---|---|---|---|---|---|---|
|  |  |  | 5-1 | 5-2 | 5-3 | 5-4 | 5-5 | 5-1 | 5-2 | 5-3 |
| Polycarbonate Physical properties of polycarbonate-mixed composition | PC/ABS ratio | Parts by | 100/100 PC-4 | 100/67 PC-4 | 100/100 PC-2 | 100/100 PC-3 | 100/67 PC-4 | 100/100 PC-3 | 100/100 PC-3 | 100/100 PC-3 |
|  | Melt flow rate | g/10 min | 27 | 29 | 62 | 62 | 32 | 49 | 36 | 42 |
|  | Izod impact 23° C. strength −30° C. (thickness: 3.2 mm) | kg · cm/ cm | 86 58 | 82 63 | 89 55 | 84 50 | 84 50 | 90 52 | 68 28 | 36 7 |
|  | Vicate softening point | ° C. | 130 | 139 | 130 | 130 | 139 | 131 | 130 | 131 |
|  | Deposit on mold |  | Acceptable | Acceptable | Acceptable | Acceptable | Acceptable | Acceptable | Acceptable | Unacceptable |
|  | Rib strength |  | Acceptable | Acceptable | Acceptable | Acceptable | Acceptable | Unacceptable | Unacceptable | Unacceptable |
| $(Mv)_{PC}/(Mn)_{ABS}$ |  |  | 0.71 | 0.71 | 0.78 | 0.76 | 0.79 | 1.3 | 0.5 | 0.55 |

What is claimed is:

1. A process for the production of a resin, including a step of polymerizing 100 parts by weight of a monomer component, which is composed of a styrene monomer and an acrylonitrile monomer or of a mixture thereof and a vinyl monomer copolymerizable with at least one of said monomers, in the presence of 4 to 50 parts by weight of a rubbery polymer by continuous bulk and/or continuous solution polymerization to form a polymer of said monomer component as a continuous phase and particles of said rubber polymer as a dispersed phase, wherein:

(1) said polymerization step comprises at least two substeps, one being a first-stage substep of forming particles of said rubbery polymer and the other being a second-stage substep of adjusting the particle sizes of said particles;

(2) said first-stage polymerization substep as said particle forming substep is conducted in a polymerization system using a stirred plug flow or stirred batch reactor, and conducts polymerization at least until said particles of said rubbery polymer are formed in the polymerization mixture by phase inversion; and (3) said second-stage polymerization substep as said particle size adjusting substep increases a converted amount of said monomer component into said polymer compared with that in said particle forming substep and makes smaller said particles of said rubbery polymer formed in said particle forming substep.

2. The process of claim 1, wherein said polymerization step further comprises, as a third-stage substep, a post-polymerization substep that subsequent to completion of said particle size adjusting substep, said polymerization is conducted further to increase a conversion rate while maintaining said particles of said rubbery polymer in the same shapes as those of said particles of said rubbery polymer at the time of said completion of said particle size adjusting substep.

3. The process of claim 1, further comprising a step so that from a polymerization mixture obtained from said polymerization step comprising said particle forming substep and said particle size adjusting substep, (i) said resin and (ii) an unreacted portion of said monomer component and an inert inorganic solvent employed in said polymerization are recovered in forms separated from each other.

4. The process of claim 1, wherein said plug flow reactor is a tower reactor.

5. The process of claim 1, wherein a back-mixed stirred tank reactor is used as a polymerization reactor in said particle size adjusting substep.

6. The process of claim 1, wherein said polymerization step is conducted to satisfy the following formula:

$$\eta_1/\eta_2 \leq 0.98$$

wherein $\eta_1$ represents a reduced viscosity of a copolymer extracted from a polymerization mixture at 25° C., which is determined at the time of completion of said particle forming substep, in a 7:3 (by weight) mixed solvent of methyl ethyl ketone (MEK) and methanol (MeOH) as measured at 30° C. using dimethylformamide (DMF) as a solvent, and $\eta_2$ represents a reduced viscosity of the copolymer extracted from the polymerization mixture determined at the time of completion of said particle size adjusting substep as measured in the same manner.

7. The process of claim 1, wherein said polymerization step is conducted so that the following formulas (I), (II), (III) and (IV) are satisfied:

$$B/A = x \quad (I)$$

$$16 \leq A \text{ and } 0.1 \leq x, \text{ and } 17.6 \leq A+B \leq 50 \quad (II)$$

$$0 < \log(D_{P1}/D_{P2}) \leq 2 \quad (III)$$

$$I_{P1}/I_{P2} \leq 15.0 \quad (IV)$$

wherein
- A represents a converted amount of said whole monomer component into said polymer at the time of completion of said particle forming substep (2) as expressed in term of parts by weight supposing that a weight of an unreacted monomer component, a weight of said converted amount of said monomer component into said polymer and a weight of said rubbery polymer is 100 parts by weight,
- B is expressed by the following formula:

$$B = C - A$$

wherein C represents a converted amount of said whole monomer into said polymer at the time of completion of said particle size adjusting substep (3) as expressed in terms of parts by weight supposing that the total of a weight of an unreacted portion of said monomer component at the time of said completion of said particle size adjusting substep (3), said weight of said converted amount of said monomer component into said polymer and said weight of said rubbery polymer is 100 parts by weight,
- $D_{P1}$ represents an average particle size of said particles of said rubbery polymer at the time of said completion of said particle forming substep as expressed in terms of μm,
- $D_{P2}$ represents an average particles size of said particles of said rubbery polymer at the time of said completion of said particle size adjusting substep as expressed in terms of μm,
- $I_{P1}$ represents a particle size distribution index of said particles of said rubbery polymer at the time of said completion of said particle forming sub-step, and
- $I_{P2}$ represents a particle size distribution index of said particles of said rubbery polymer at the time of said completion of said particle size adjusting substep.

8. The process of claim 7, wherein said polymerization step is conducted so that the following formulas (V) and (VI) are satisfied:

$$18 \leq A \text{ and } 0.1 \leq x \leq 1.5, \text{ and } 19.8 \leq A+B \leq 45 \quad (V)$$

$$D_{P1} < 2.0, \text{ and } 0 < \log(D_{P1}/D_{P2}) \leq 1.0 \quad (VI).$$

9. The process of claim 7, wherein said particle forming substep is conducted for a residence time of from 0.5 to 3 hours, and said particle size adjusting substep is conducted for a residence time which ranges from 0.2 to 2.5 hours and is 0.2 to 0.9 times as long as said residence time of said particle forming substep.

10. The process of claim 1, wherein said rubbery polymer comprises at least butadiene parts, and a grafting degree of a styrene/acrylonitrile copolymer on said butadiene parts of said rubbery polymer in said resin ranges from 55 to 200%.

11. The process of claim 1, wherein said rubbery polymer comprises at least two types of styrene-butadiene copolymers (SBR) $R_1, R_2$, and said polymerization step is conducted so that the following formulas (VII), (VIII), (IX) and (X) are satisfied:

$$5 \leq SV_1 \leq 50, 12 \leq ST_1 \leq 30 \quad (VII)$$

$$5 \leq SV_2 \leq 60, 25 \leq ST_2 < 50 \quad (VIII)$$

$$3 \leq ST_2 - ST_1 \leq 35 \quad (IX)$$

$$1 \leq R_1/R_2 \leq 9 \quad (X)$$

wherein
- $SV_1$ represents a viscosity of a 5 wt. % styrene solution of said styrene-butadiene copolymer $R_1$ at 25° C. as expressed in terms of centipoises,
- $ST_1$ represents a content of styrene in said styrene-butadiene copolymer $R_1$ as expressed in terms of wt. %,
- $SV_2$ represents a viscosity of a 5 wt. % styrene solution of said styrene-butadiene copolymer $R_2$ at 25° C. as expressed in terms of centipoises, and
- $ST_2$ represents a content of styrene in said styrene-butadiene copolymer $R_2$ as expressed in terms of wt. %.

12. A polycarbonate resin composition comprising:
(I) 100 parts by weight of a thermoplastic polycarbonate carbonate, and
(II) 10 to 500 parts by weight of a resin; wherein
1) said resin (II) is prepared by the process of claim 1,
2) said resin (II) comprises 5 to 30 wt. % of said rubbery polymer,
3) a polymer component (A) in said resin (II), said polymer component (A) being prepared by elimination of insoluble components from said resin (II) through extraction of said resin (II) at 25° C. with a 7:3 (by weight) mixed solvent of methyl ethyl ketone and methanol, comprises 8 to 30 wt. % of an acrylonitrile component,
4) said polymer component (A) has a reduced viscosity ($\eta_{sp}/c$) of from 0.2 to 0.65 dl/g, and
5) said rubbery polymer comprises at least butadiene parts, and a grafting degree of a styrene/acrylonitrile copolymer on the butadiene parts of said rubbery polymer in said resin (II) ranges from 55 to 200%.

13. The composition of claim 12, wherein said rubbery polymer in said resin (II) has an average particle size of from 0.3 to 3 μm; said polymerization step of said resin (II) is conducted so as to satisfy the following formula:

$$\eta_1/\eta_2 \leq 0.98$$

wherein
- $\eta_2$ represents a reduced viscosity of said polymer component (A) determined at the time of completion of said particle size adjusting substep as measured at 30° C. using dimethylformamide (DMF) as a solvent, and
- $\eta_1$ represents a reduced viscosity of the polymer component available at the time of completion of said particle forming substep as measured in the same manner.

14. The composition of claim 12, wherein said polymer component (A), said polymer component (A) being prepared by elimination of insoluble components from said resin (II) through extraction of said resin (II) at 25° C. with a 7:3 (by weight) mixed solvent of methyl ethyl ketone and methanol, has a number average molecular weight of from 10,000 to 40,000; and a relationship between said number average molecular weight of said polymer component (A) in said resin (II) and a viscosity average molecular weight of said thermoplastic polycarbonate (I) is represented by the following formula (11):

$$0.7 < (Mv)_{PC}/(Mn) < 0.8 \quad (11).$$

15. The composition of claim 12, wherein said polymer component (A) comprises 10 to 18 wt. % of said acrylonitrile component and has a reduced viscosity of from 0.3 to 0.45 dl/g, and said grafting degree of said styrene/acrylonitrile copolymer on said butadiene parts of said rubbery polymer in said resin (II) ranges from 75 to 200%.

16. A resin prepared by a continuous production process including a step of polymerizing 100 parts by weight of a monomer component, which is composed of a styrene monomer and an acrylonitrile monomer or of a mixture thereof and a vinyl monomer copolymerizable with at least one of said monomers, in the presence of 4 to 50 parts by weight of a rubbery polymer by continuous bulk and/or continuous solution polymerization to form a polymer of said monomer component as a continuous phase and particles of said rubber polymer as a dispersed phase, wherein:

(1) said polymerization step comprises at least two substeps, one being a first-stage substep of forming particles of said rubbery polymer and the other being a second-stage substep of adjusting the particle sizes of said particles;

(2) said first-stage polymerization substep as said particle forming substep is conducted in a polymerization system using a stirred plug flow or stirred batch reactor, and conducts polymerization at least until said particles of said rubbery polymer are formed in the polymerization mixture by phase inversion; and (3) said second-stage polymerization substep as said particle size adjusting substep increases a converted amount of said monomer component into said polymer compared with that in said particle forming substep and makes smaller said particles of said rubbery polymer formed in said particle forming substep.

17. An resin available by the production process of claim 16, wherein said polymerization step is conducted so that the following formula is satisfied:

$$I_{P1}/I_{P2} \leq 15.0$$

wherein $I_{P1}$ represents a particle size distribution index of said particles of said rubbery polymer at the time of said completion of said particle forming sub-step, and $I_{P2}$ represents a particle size distribution index of said particles of said rubbery polymer at the time of said completion of said particle size adjusting substep.

* * * * *